(12) United States Patent
Siemer, Jr. et al.

(10) Patent No.: US 10,995,842 B1
(45) Date of Patent: May 4, 2021

(54) PULLEY WITH HINGED SIDE PLATE

(71) Applicant: Summit Rescue, Inc., Ferndale, WA (US)

(72) Inventors: Richard H. Siemer, Jr., Bellingham, WA (US); Christopher Starr, Ferndale, WA (US)

(73) Assignee: Summit Rescue, Inc., Ferndale, WA (US)

( * ) Notice: Subject to any disclaimer, the term of this patent is extended or adjusted under 35 U.S.C. 154(b) by 0 days.

(21) Appl. No.: 16/776,470

(22) Filed: Jan. 29, 2020

Related U.S. Application Data

(60) Provisional application No. 62/798,975, filed on Jan. 30, 2019.

(51) Int. Cl.
*F16H 55/52* (2006.01)
*B66D 3/04* (2006.01)
*F16H 55/36* (2006.01)

(52) U.S. Cl.
CPC ............. *F16H 55/52* (2013.01); *F16H 55/36* (2013.01)

(58) Field of Classification Search
CPC ......... F16H 55/32; F16H 55/36; B66D 3/046; B66D 3/04
See application file for complete search history.

(56) References Cited

U.S. PATENT DOCUMENTS

| | | |
|---|---|---|
| 686,154 A | 11/1901 | Smith |
| 796,366 A | 8/1905 | Smith |
| 2,382,049 A | 8/1945 | Frankhouser |
| 2,449,703 A | 9/1948 | Johnson |
| 2,555,059 A | 5/1951 | Schrader |
| 2,633,329 A | 3/1953 | Le Bus |
| 2,741,458 A | 4/1956 | Le Bus, Sr. |
| 2,754,084 A * | 7/1956 | Bus, Sr. ................. B66D 3/046 254/406 |
| 3,372,908 A | 3/1968 | McCarthy |
| 3,819,154 A | 6/1974 | Miller |
| 3,899,158 A | 8/1975 | Johnson |
| 3,999,739 A | 12/1976 | Vick et al. |

(Continued)

OTHER PUBLICATIONS

"75 mm Carbo," website: Harken.com, accessed May 27, 2020, URL: <https://www.harken.com/productcategory.aspx?taxid=419>.

(Continued)

*Primary Examiner* — Michael E Gallion
(74) *Attorney, Agent, or Firm* — Lowe Graham Jones PLLC

(57) ABSTRACT

Embodiments are directed toward a pulley. The pulley preferably has a fixed side plate, an operable side plate, a sheave, and a double-action lock. The operable side plate is preferably transitionable between a closed configuration and an open configuration. The sheave is preferably disposed between the fixed side plate and the operable side plate. The double-action lock is preferably transitionable from a locked configuration to an unlocked configuration upon completion of two separate and distinct actions. The lock in the locked configuration preferably prevents transition of the operable side plate from the closed configuration to the open configuration. The lock in the unlocked configuration preferably permits transition of the operable side plate from the closed configuration to the open configuration.

21 Claims, 42 Drawing Sheets

(56) References Cited

U.S. PATENT DOCUMENTS

| | | | | |
|---|---|---|---|---|
| 4,056,257 A | | 11/1977 | Kaiser | |
| 4,325,537 A | * | 4/1982 | Winter | B66D 3/046 |
| | | | | 114/204 |
| 4,348,116 A | | 9/1982 | Bordas | |
| 4,614,332 A | | 9/1986 | Wilson | |
| 4,760,993 A | | 8/1988 | Du Preez | |
| 5,056,760 A | * | 10/1991 | Jorgensen | B66D 3/046 |
| | | | | 254/406 |
| 5,249,543 A | * | 10/1993 | Rutgerson | B66D 3/046 |
| | | | | 114/108 |
| 5,725,200 A | | 3/1998 | Gordon | |
| 5,845,894 A | * | 12/1998 | Petzl | A62B 1/14 |
| | | | | 254/391 |
| 6,244,570 B1 | | 6/2001 | Habberstad | |
| 6,263,999 B1 | | 7/2001 | Atkinson et al. | |
| 6,481,695 B1 | | 11/2002 | Fuller | |
| 7,168,687 B2 | | 1/2007 | Thompson | |
| 9,120,654 B2 | * | 9/2015 | Chaumontet | A62B 1/10 |
| 9,908,749 B2 | * | 3/2018 | Lob | B66D 3/04 |
| 2012/0012800 A1 | * | 1/2012 | Chaumontet | B66D 3/046 |
| | | | | 254/391 |
| 2015/0183624 A1 | * | 7/2015 | Maurice | B66D 3/046 |
| | | | | 254/399 |
| 2020/0032928 A1 | * | 1/2020 | Bouchard | H02G 1/04 |

OTHER PUBLICATIONS

"Buckingham OX Block," website: The Arborist Store, accessed May 27, 2020, URL: <https://thearboriststore.com/products/buckingham-ox-block?variant=22778591939>.

"CMC Clutch by Harken Industrial," website: CMC PRO, accessed May 27, 2020, URL: <https://www.cmcpro.com/equipment/cmc-clutch-by-harken-industrial/>.

Website: Rock Exotica, accessed Jun. 29, 2020, URL: <https:www.rockexotica.com/product/pulleys>.

"Johnson SB12S6BS 6 Snatch Block w/ Shackle—12 Ton WLL—#474412," website: Westech Rigging Supply, accessed May 27, 2020, URL: <https://www.westechrigging.com/johnson-snatch-block-sb12s6bs.html>.

"Maestro S," website: Petzl, accessed May 27, 2020, URL: <https://www.petzl.com/US/en/Professional/Descenders/MAESTRO-S>.

"PRO," website: Petzl, accessed May 27, 2020, URL: <https://www.petzl.com/US/en/Professional/Pulleys/PRO>.

"PRO TRAXION," website: Petzl, accessed May 27, 2020, URL: <https://www.petzl.com/US/EN/Sport/Pulleys/PRO-TRAXION>.

"ROLLNLOCK," website: climbingtechnology.com, accessed May 27, 2020, URL: <https://www.climbingtechnology.com/en/professional-en/pulleys-and-rope-clamps/pulleys-rope-clamps/rollnlock_>.

"RPM Shackles & Components," website: DMM Professional, accessed May 27, 2020, URL: <https://dmmprofessional.com/Products/Pulleys/RPM-System/>.

"SPOC," website: Edelrid.de, accessed May 27, 2020, URL: <https://www.edelrid.de/en/sports/pulleys/spoc.html>.

Seattle Manufacturing Corporation website: SMCGear.com, accessed Jun. 29, 2020, URL: <https://smcgear.com/gear-shop/pulleys/all-pulleys.html?product_list_limit=all>.

\* cited by examiner

PULLEY WITH HINGED SIDE PLATE

CROSS-REFERENCE TO RELATED PATENT APPLICATIONS

This utility application claims the benefit of provisional U.S. Patent Application No. 62/798,975, filed Jan. 30, 2019, titled "Pulley with Hinged Side Plate", which is incorporated herein by reference in its entirety.

FIELD OF THE INVENTION

The invention relates generally to pulleys and, more particularly, to pulleys having hinged side plates.

BACKGROUND OF THE INVENTION

In general, pulleys support the movement of and change the direction of taut elements, such as ropes, cables, belts, or chains that extend through the pulleys. This characteristic allows pulleys to be arranged in manners that provide mechanical advantage that amplifies the force applied to the taut elements, such as in a block-and-tackle arrangement. Pulleys often require reeving the elements through the pulleys to prepare the system for bearing a load. The side plates of some pulleys pivot about the axis of the one or more sheaves in the pulley. A pulley having such hinged side plates eliminates the need for reeving because pivoting the hinged side plates to an open configuration exposes the one or more sheaves in the pulley to allow a user to set a bight of the element such as rope or cable onto the one or more sheaves and returning the hinged side plates to a closed configuration to provide a rove pulley.

The hinged side plates are typically locked into the closed configuration with another object, such as a carabiner, that extends through a hole in each side plate of the pulley. The object then anchors the pulley to a support, such as a tripod. Although reliable, carabiners are prone to being lost when not in use. Moreover, this arrangement requires separating the pulley from the support to add or remove the element such as rope.

Some pulleys having hinged side plates include an operable side plate, a fixed side plate, and a lock. The fixed side plate often connects to a thimble that may be fixed or rotate about a thimble axis. The operable side plate typically pivots about the axis of the one or more sheaves in the pulley relative to the fixed side plate to transition the pulley between the closed configuration and the open configuration. The lock is typically located at or near the thimble and is typically laterally offset from the thimble axis. The lock is typically a simple spring-biased button that can be depressed toward the fixed side plate. When in the undepressed configuration, the button extends through a hole in the operable side plate, thereby locking the pulley in the closed configuration. When the button is depressed, the operable side plate is free to pivot relative to the fixed side plate and thereby transition the pulley to the open configuration. This arrangement allows adding or removing the element such as rope without separating the pulley from the support. This arrangement, however, leaves the pulley susceptible to unintentional transitioning from the closed configuration to the open configuration in use because the taut element (or another item) can snag or depress the lock and subsequently open the lock. Moreover, when the lock is in the unlocked configuration and the thimble is disposed above the one or more sheaves of the pulley, the force of gravity pulls the operable face into the open configuration. Accordingly, such pulleys having hinged side plates and locks pose danger to users, bystanders, and equipment. An additional factor of safety may be desirable.

SUMMARY OF THE INVENTION

It is therefore an object of the present invention to provide pulleys having hinged side plates and locks, wherein accidental actuation of the locks by taut elements that extend through the pulleys or by other means is prevented.

It is also an object of the present invention to provide pulleys having hinged side plates and locks that achieve the above object and that also facilitate actuation of the locks with only a single hand.

It is another object of the present invention to provide pulleys having hinged side plates and locks that achieve the above objects and that also facilitate both actuation of the locks and transition of the hinged face plates into the open configuration with only a single hand.

The invention achieves the above objects, as well as other objects and advantages that will become apparent from the description that follows, by providing a pulley. The pulley preferably has a fixed side plate, an operable side plate, a sheave, and a double-action lock. The operable side plate is preferably transitionable between a closed configuration and an open configuration. The sheave is preferably disposed between the fixed side plate and the operable side plate. The double-action lock is preferably transitionable from a locked configuration to an unlocked configuration upon completion of two separate and distinct actions. The lock in the locked configuration preferably prevents transition of the operable side plate from the closed configuration to the open configuration. The lock in the unlocked configuration preferably permits transition of the operable side plate from the closed configuration to the open configuration.

In some versions, the two actions include a first action and a second action. The lock preferably prevents a user from initiating the second action until the first action is complete.

In some versions, the lock has an interface component, such as a first interface component. The first action preferably includes pivoting the interface component. In some versions, the first action includes sliding the interface component. The second action preferably includes depressing the first interface component or a second interface component. In some versions, the second action includes pivoting the first or second interface component.

In some versions, the operable side plate is configured to transition the lock from the locked configuration to the unlocked configuration when the operable side plate transitions from the open configuration to the closed configuration. The operable side plate is preferably configured to transition the lock from the locked configuration to the unlocked configuration and back to the locked configuration when the operable side plate transitions from the open configuration to the closed configuration. The operable side plate is preferably configured to transition the lock from the locked configuration to the unlocked configuration during the transition from the open configuration to the closed configuration and to transition the lock from the unlocked configuration to the locked configuration responsive to completion of the transition from the open configuration to the closed configuration. The operable side plate is preferably configured to initiate and complete the second action when the operable side plate transitions from the open configuration to the closed configuration. The operable side plate is preferably configured to initiate and complete the first action and subsequently initiate and complete the second when the operable side plate transitions from the open configuration to the closed configuration. In some versions, the operable side plate is configured to initiate and complete the second action when the operable side plate transitions from the open configuration to the closed configuration without the first action being initiated.

In some versions, the lock has a combination spring. The combination spring preferably biases the lock toward a default locked configuration. In the default locked configuration of the lock, preferably neither of the two actions has been initiated. The combination spring preferably provides a torsion bias and an extension bias. In some versions, the combination spring provides a torsion bias in a first rotational direction and a torsion bias in a second rotational direction that is opposite the first rotational direction. In some versions, the lock has multiple springs.

In some versions, the lock is coaxial with the sheave. In some versions, the lock engages a projection that is coaxial with the sheave. In some versions, the operable side plate is coaxial with the sheave.

In some versions, the lock includes a rod. The rod preferably defines an indexed recess. The lock preferably includes a housing that houses the rod. The lock preferably includes a pin. The pin preferably extends from the housing into the indexed recess of the rod. The indexed recess preferably includes an axial recess portion and a circumferential recess portion. Each of the portions of the indexed recess preferably correspond to separate and distinct actions of the lock.

The invention achieves the above objects, as well as other objects and advantages that will become apparent from the description that follows, by providing a method of using the pulley. The pulley is preferably provided to a user. The user preferably completes a first action of the two separate and distinct actions of the double-action lock. After completing the first action, the user preferably completes a second action of the two separate and distinct actions of the double-action lock. After completing the second action, the user preferably transitions the operable side plate from the closed configuration to the open configuration. After transitioning the operable side plate to the open configuration, the user preferably places a bight of an elongated element, such as a rope, on the sheave. After placing the bight on the sheave, the user preferably transitions the operable side plate from the open configuration to the closed configuration.

In some versions, transitioning the operable side plate from the open configuration to the closed configuration includes transitioning the lock from the locked configuration to the unlocked configuration and back to the locked configuration without the user touching the lock. In some versions, the user must manually unlock the lock to transition the operable side plate from the open configuration to the closed configuration.

BRIEF DESCRIPTION OF THE DRAWINGS

Preferred and alternative examples of the present invention are described in detail below with reference to the following drawings.

DETAILED DESCRIPTION OF THE PREFERRED EMBODIMENTS

Figure 1:
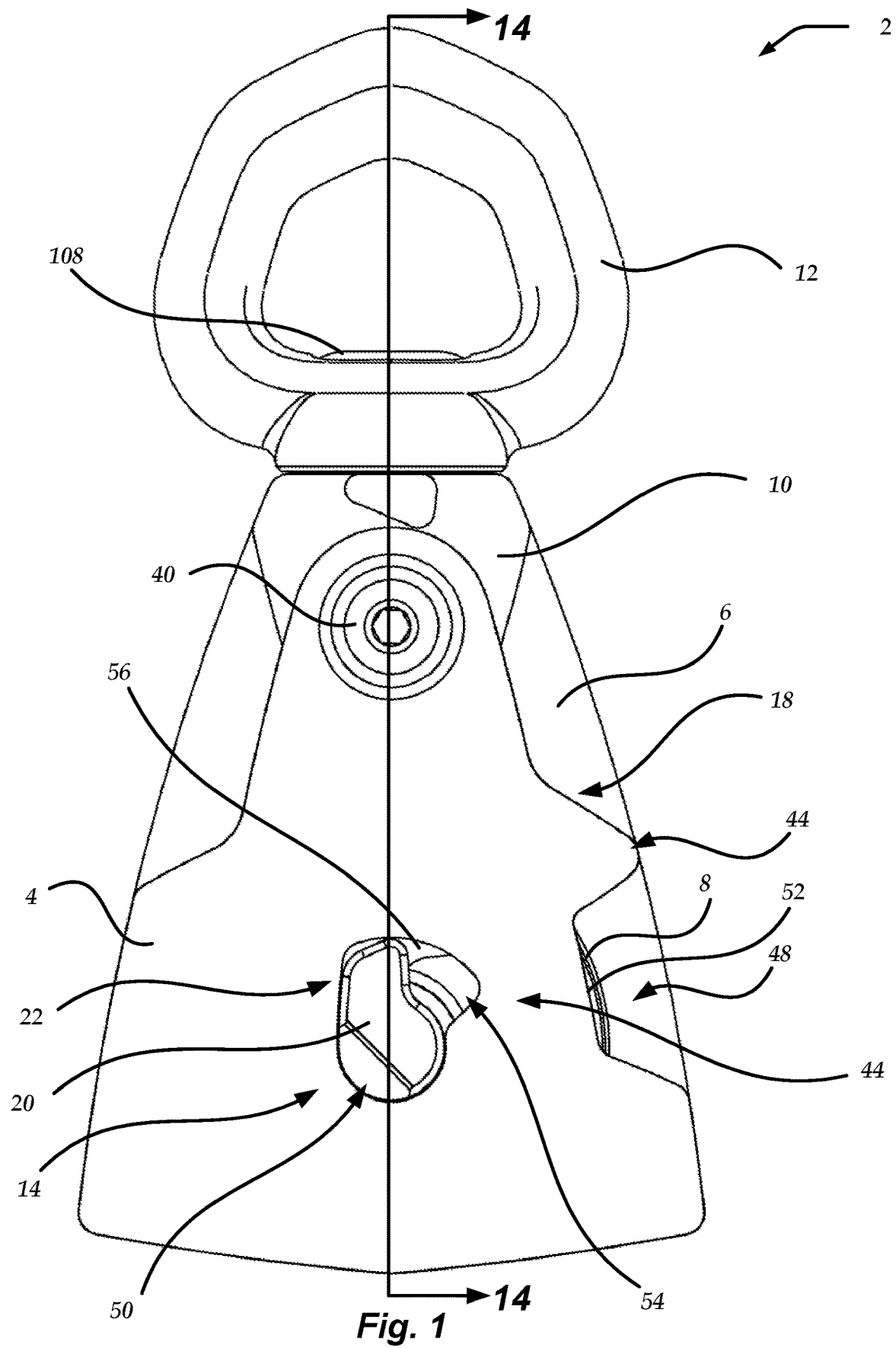
FIG. 1 is a front-side elevational view of a preferred pulley having an operable side plate and a double-action lock, showing the operable side plate in a closed configuration and the lock in a locked configuration with no actions initiated.
Figure 4:
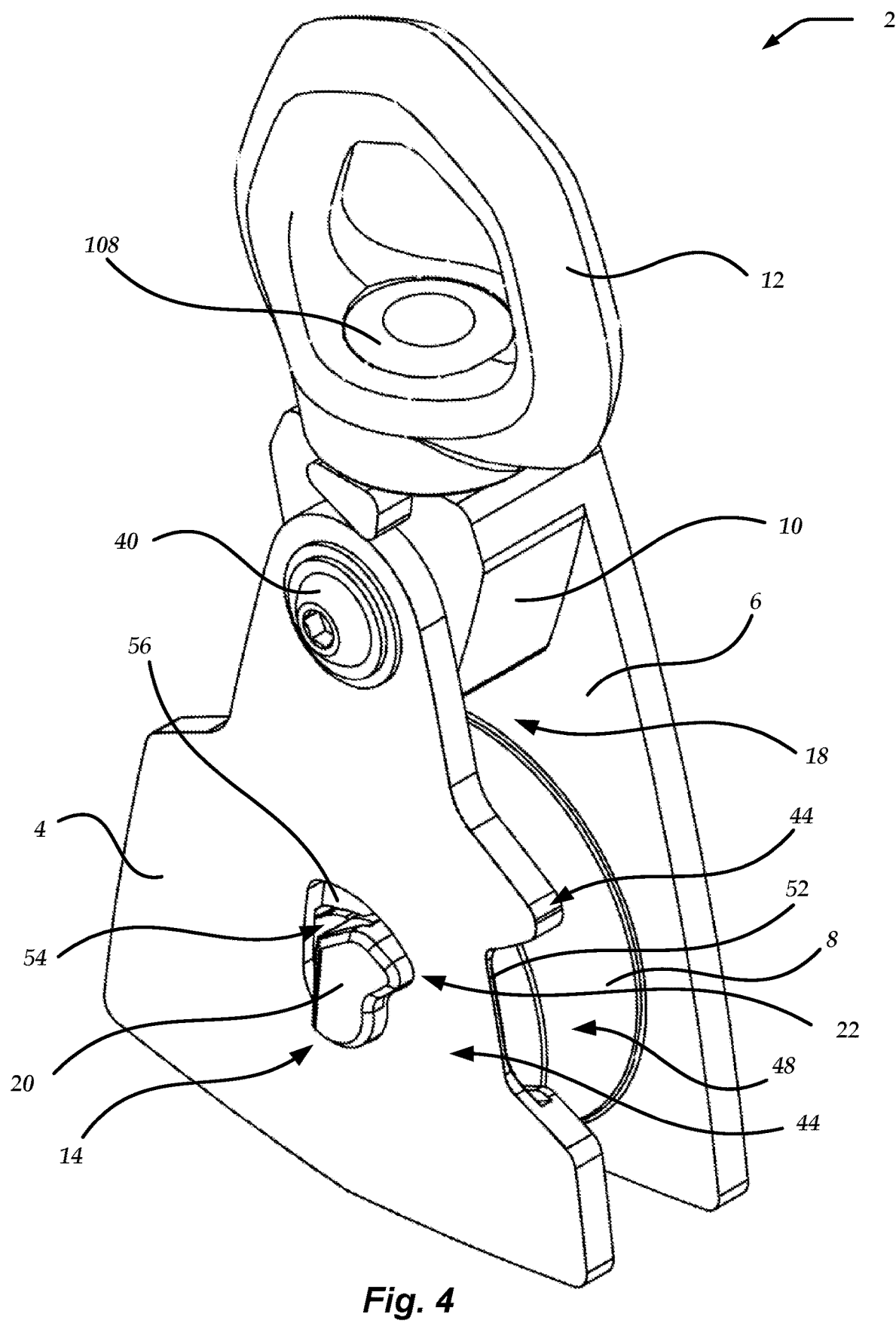
FIG. 4 is a front, left isometric view of the pulley of FIG. 1, showing the lock in a locked configuration with a first action complete.
Figure 5:
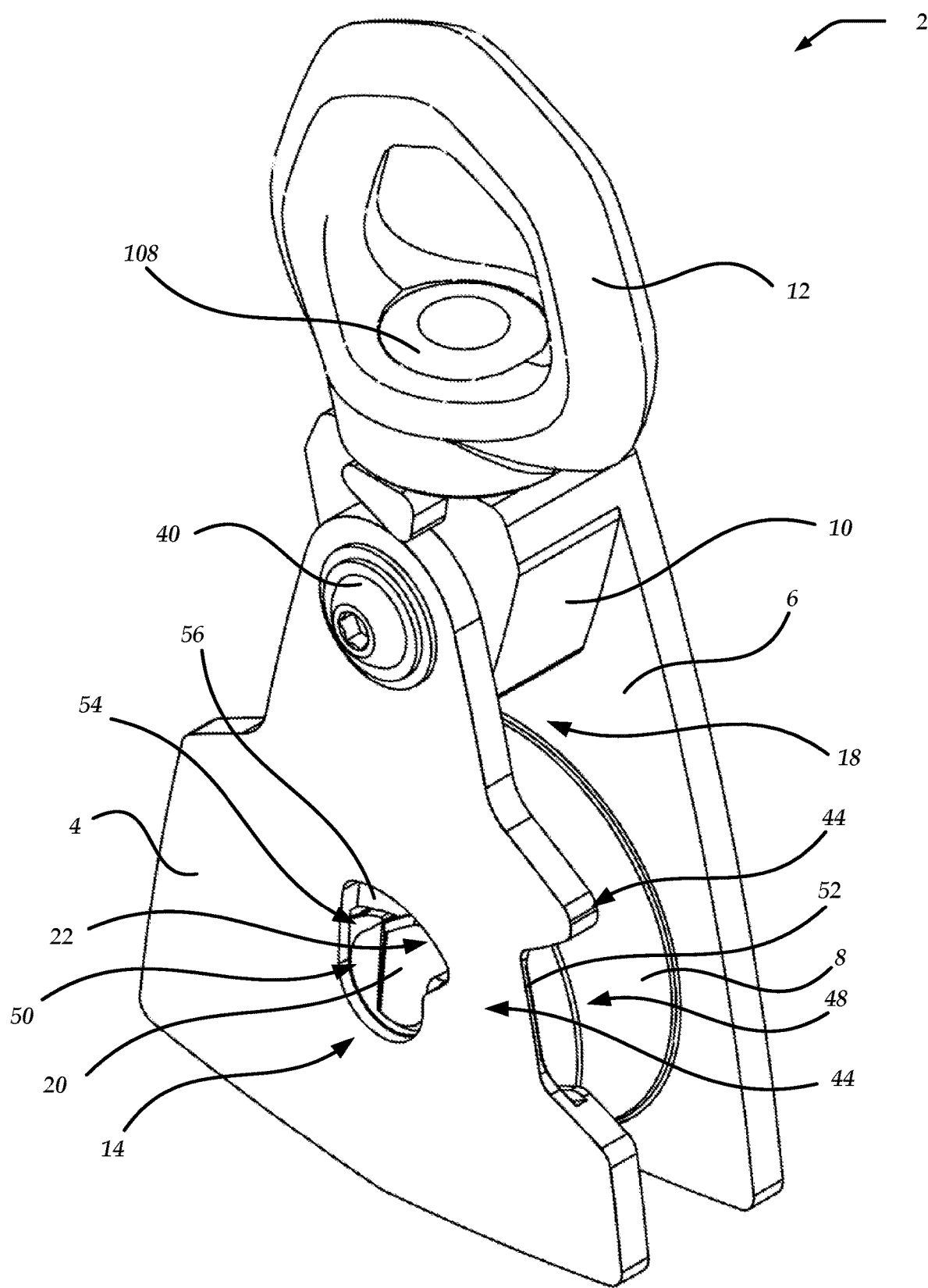
FIG. 5 is a front, left isometric view of the pulley of FIG. 1, showing the lock in an unlocked configuration with a second action complete.
Figure 6:
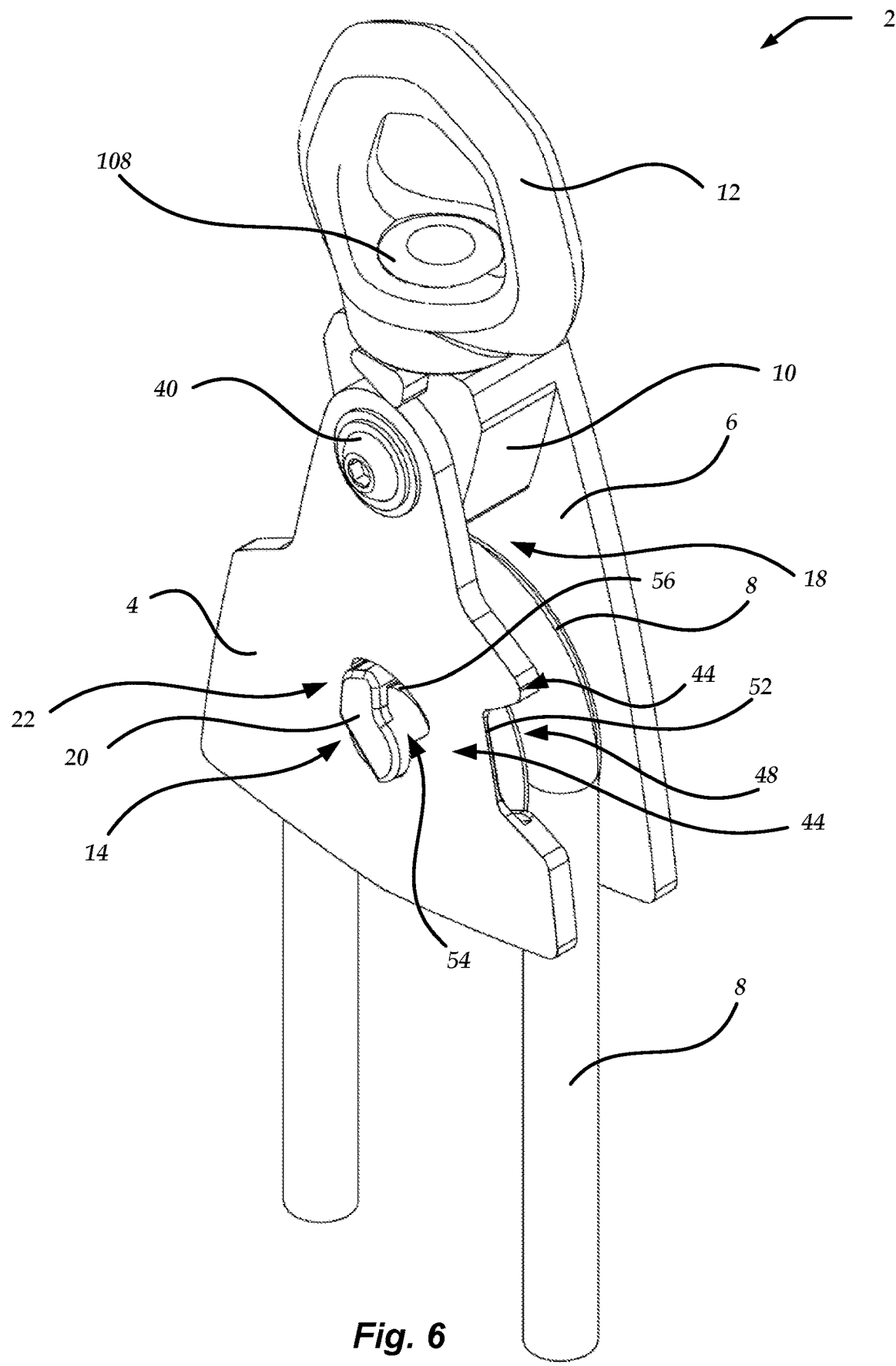
FIG. 6 is a front, left isometric view of the pulley of FIG. 1, in a rove configuration.
Figure 7:
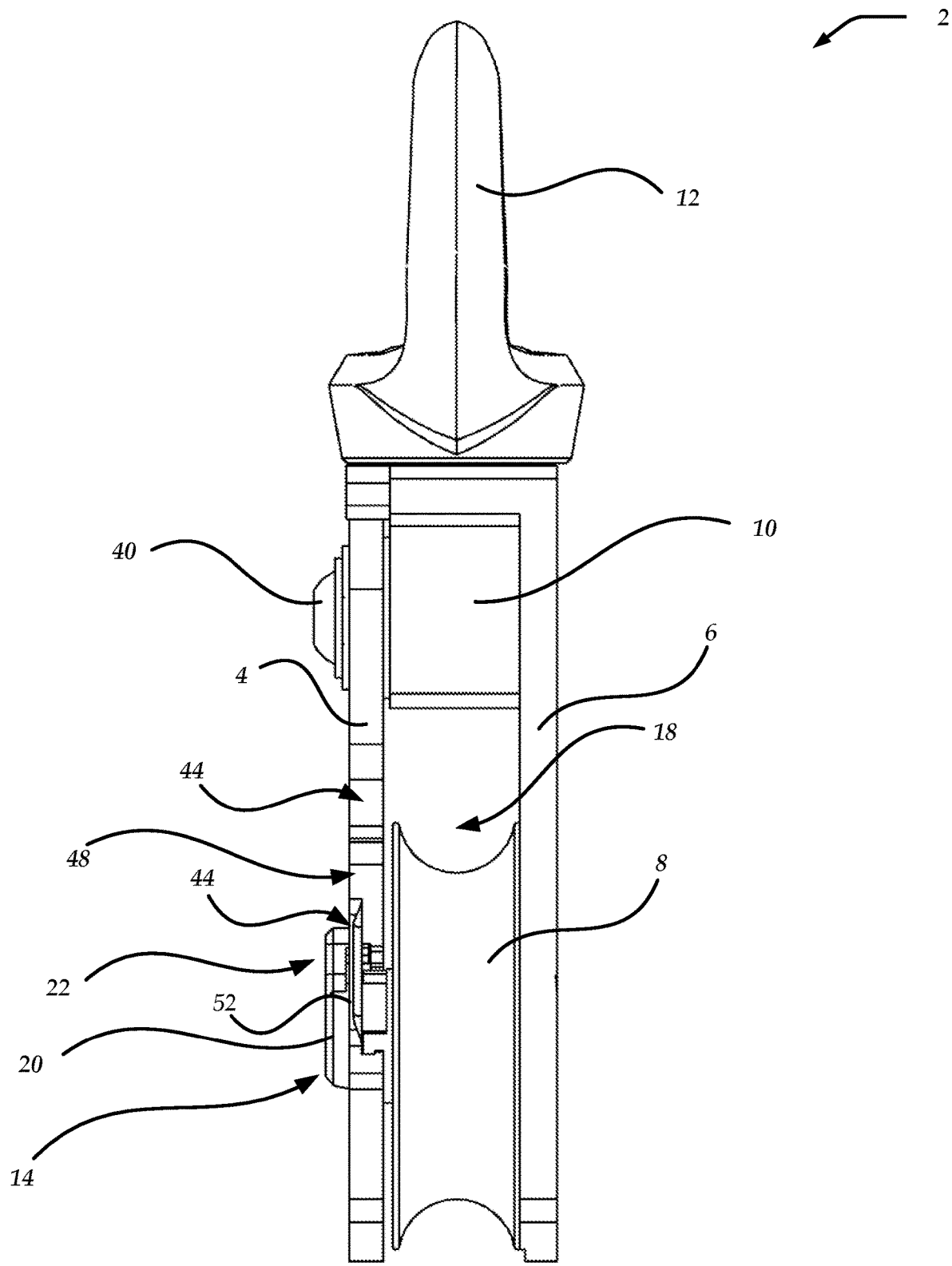
FIG. 7 is a left-side elevational view of the pulley of FIG. 1.
Figure 8:
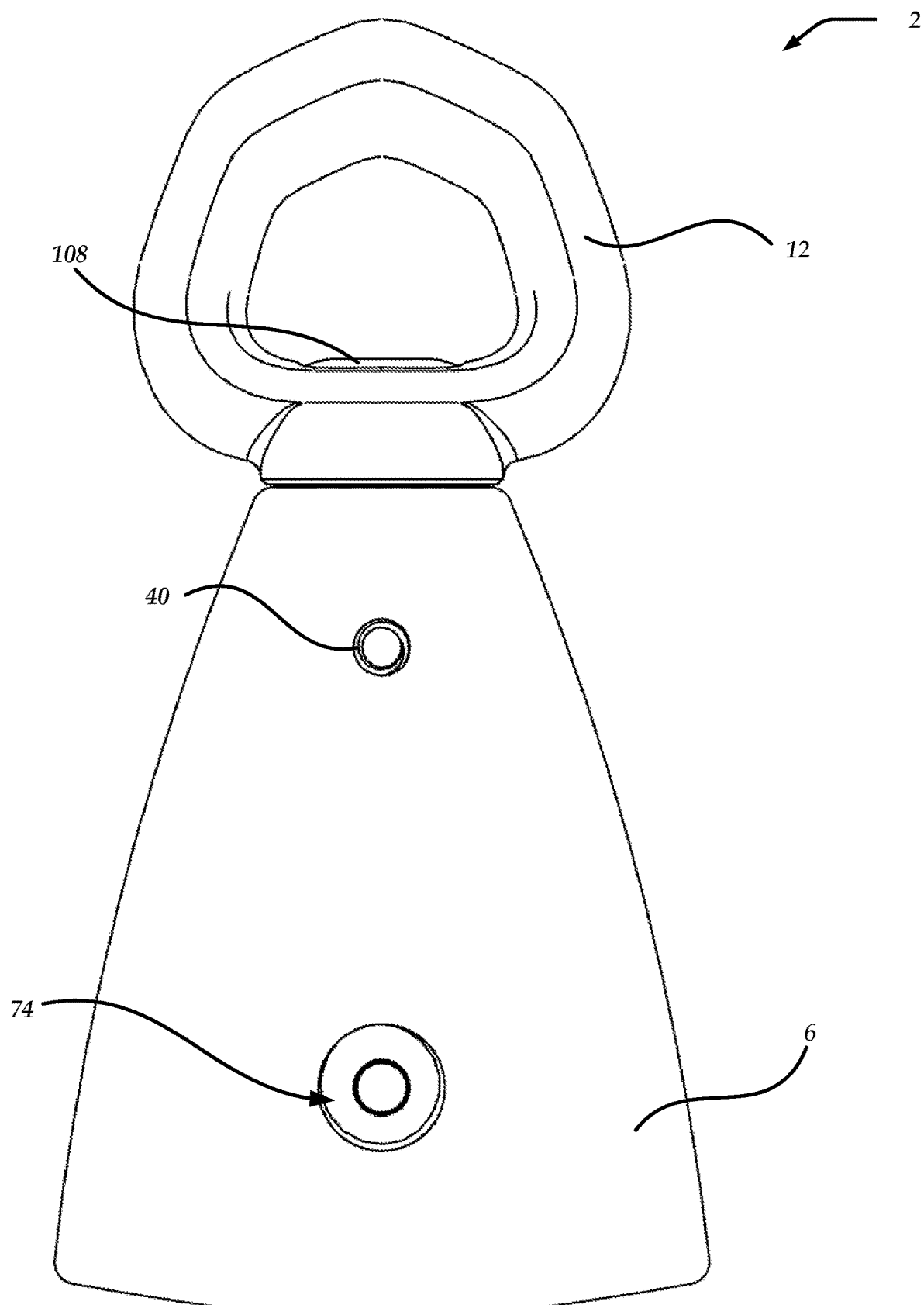
FIG. 8 is a rear-side elevational view of the pulley of FIG. 1.
Figure 9:
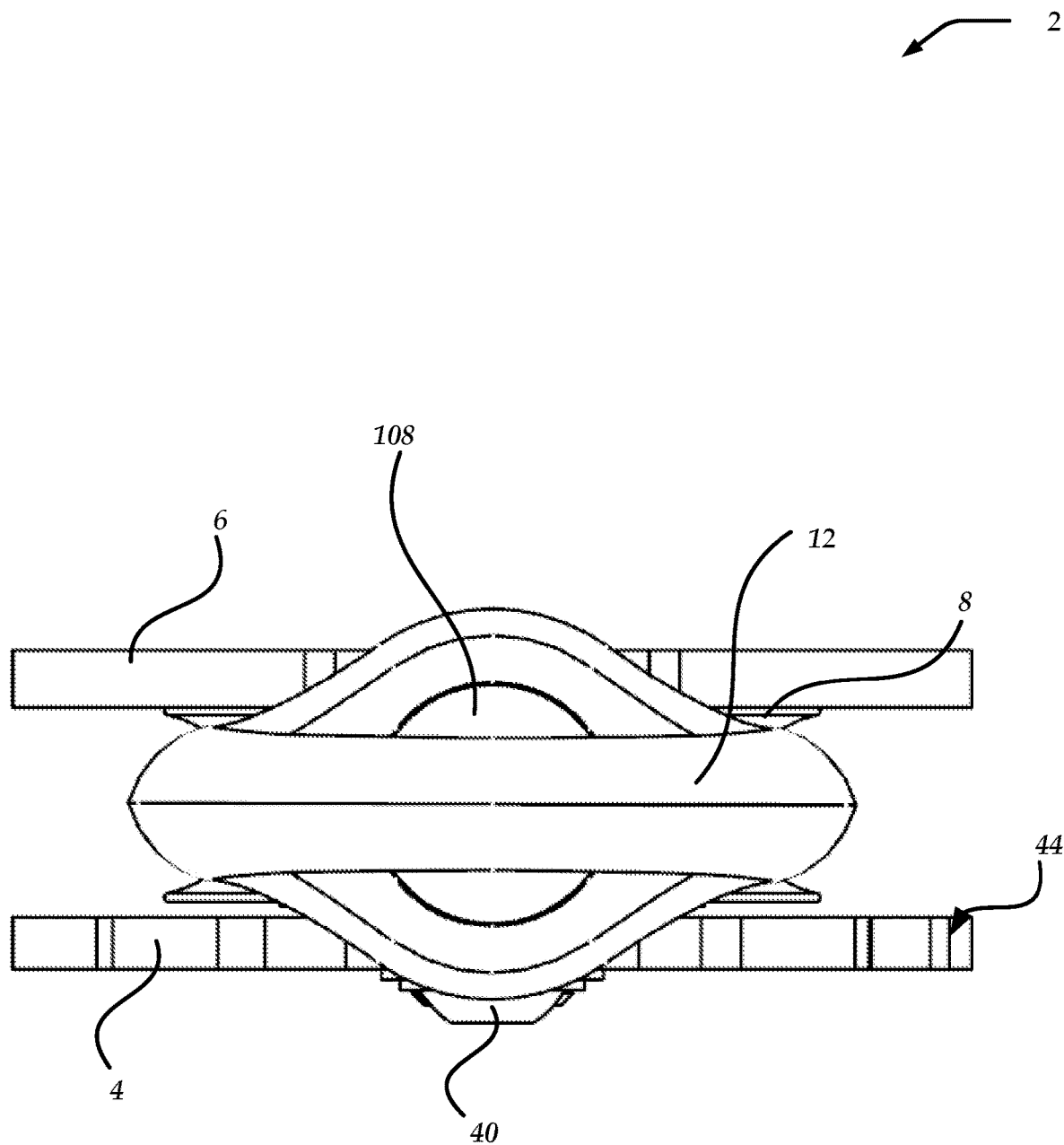
FIG. 9 is a top plan view of the pulley of FIG. 1.
Figure 10:
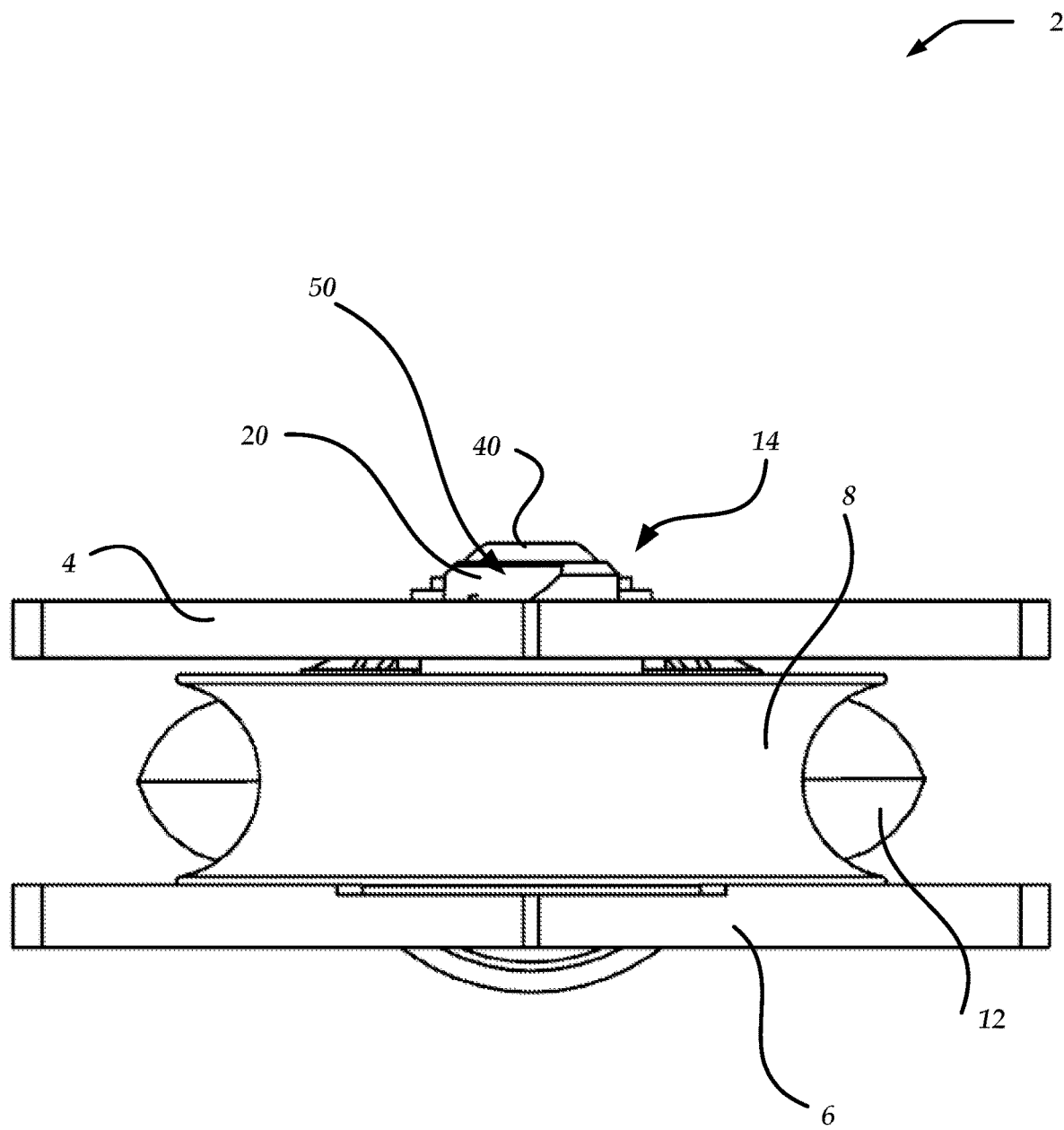
FIG. 10 is a bottom plan view of the pulley of FIG. 1.

A preferred pulley 2 in accordance with the principles of the invention is shown in FIG. 1. The pulley 2 preferably has two side plates 4, 6, a sheave 8 disposed between the two side plates 4, 6, a crown 10, a shackle or thimble 12 that extends from the crown 10, and a lock 14. The side plate 6 is preferably fixed relative to the crown 10 or the thimble 12 and, therefore, is referred to herein as a fixed side plate. The side plate 4 is preferably operable to transition between a closed configuration (see FIG. 1) and an open configuration (see FIG. 2) by pivoting relative to the fixed plate 6 and, therefore, is referred to herein as an operable side plate. The lock 14 preferably secures the operable side plate 4 in the closed configuration when the lock 14 is in a locked configuration (see FIGS. 3 and 4) and preferably permits transitioning the pulley from the closed configuration to the open configuration when the lock 14 is in an unlocked configuration (see FIG. 5). The lock 14 preferably requires two separate and distinct actions to be completed (see FIGS. 4 and 5), one (see FIG. 4) before the other (see FIG. 5), to transition the lock 14 from the locked configuration to the unlocked configuration and, therefore, is referred to herein as a double-action lock. When the pulley 2 is in the open configuration, a user may set a bight of a flexible, elongated element 16 (for example, a rope, cable, belt, or chain) into a bight passage or swallow 18 and return the operable side plate 4 to the closed configuration to provide a rove pulley 2 (see FIG. 6).

Figure 3:
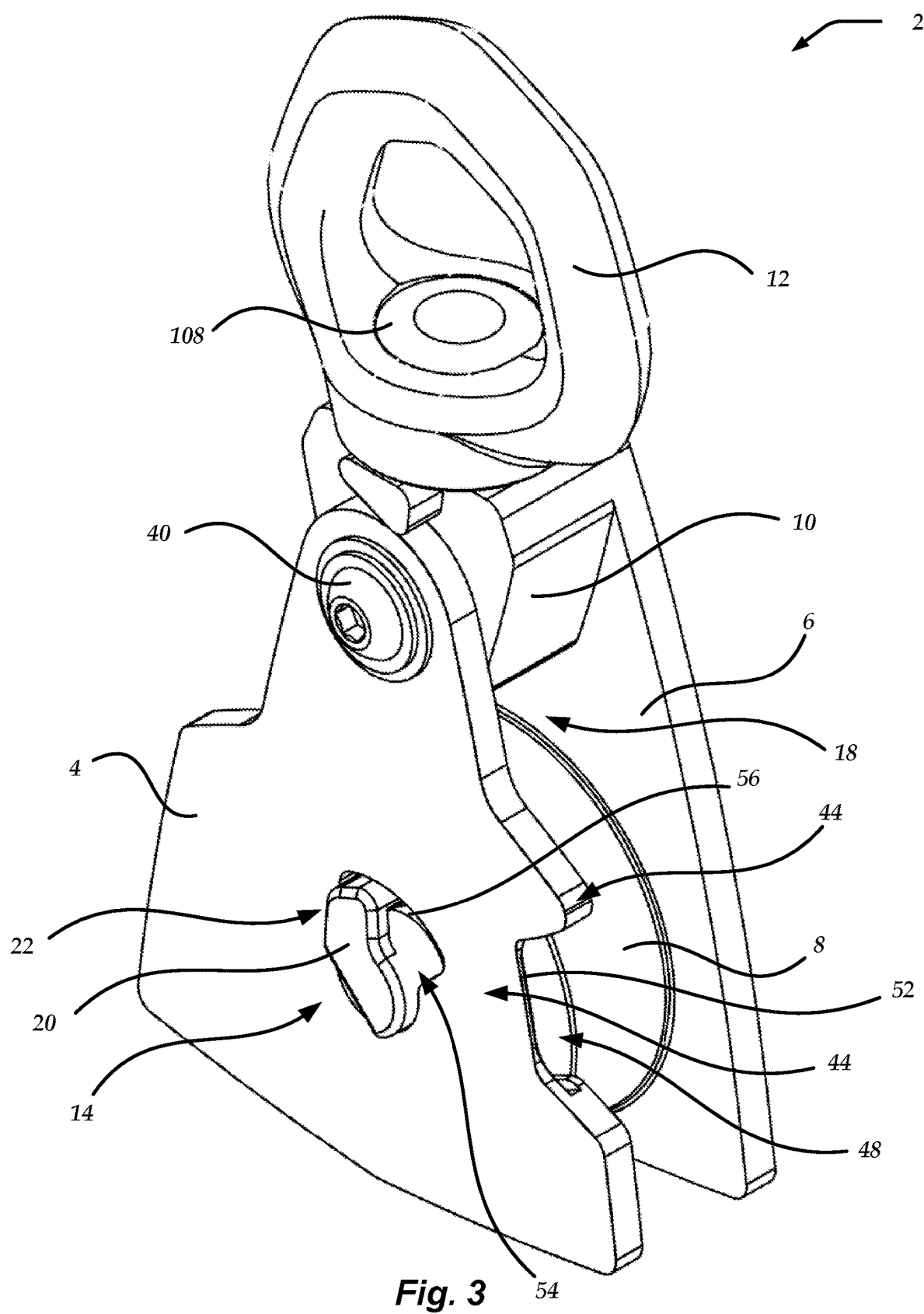
FIG. 3 is a front, left isometric view of the pulley of FIG. 1, showing the lock in a default locked configuration.

The lock 14 preferably has one or more interface components, such as interface component 20 (for example, a lever, slide, grip, or button). Each interface component is preferably accessible for user manipulation without requiring a tool (for example, by hand or finger only) and preferably, responsive to user manipulation of the interface component, initiates or actuates a corresponding action of the lock 14. The lock 14 is preferably configured to prevent initiation of the second action (see FIG. 5) before completion of the first action (see FIG. 4). The lock 14 is preferably biased (for example, spring biased) toward the locked configuration with no actions initiated as shown in FIG. 3, and, therefore, the configuration shown in FIG. 3 is referred to herein as the default locked configuration. The interface component 20 of the lock 14 preferably has a lever portion 22 that, responsive to sufficient force applied to the lever portion 22 in a plane parallel to the outer face of the operable side, causes the interface component 20 to rotate (see FIGS. 3 and 4). Pivoting the interface component 20 away from the default locked configuration (contrast FIGS. 3 and 4) actuates the first action of the lock 14. Once the first action of the lock 14 is complete, the user preferably may depress the interface component 20 to actuate the second action of the lock 14 (contrast FIGS. 4 and 5) and thereby transition the lock 14 from the locked configuration to the unlocked configuration.

The pulley 2 preferably has a shackle or crown pin 40 that rotatably couples the operable side plate 4 to the crown 10 or the fixed plate 6 (see FIGS. 1, 2, and 7-10). Accordingly, when the lock 14 is in the unlocked configuration, the user preferably may pivot the operable side plate 4 relative to the crown 10, thimble 12, or the fixed plate 6 to expose the swallow 18. At least a portion of the lock 14 is preferably coupled to or a part of a sheave assembly 42 (see FIG. 11). Accordingly, when the operable side plate 4 pivots, the lock 14 preferably remains at a fixed location. The operable side plate 4 preferably has a bridge portion 44 that slides over the lock 14 as the operable side plate 4 transitions between the closed configuration and the open configuration and that increases the structural strength of the operable side plate 4 (see FIGS. 1, 2, and 11). The thickness of the bridge portion 44 is preferably less than the thickness of the remainder of the operable side plate 4 to facilitate the bridge portion 44 sliding over the lock 14 (see FIGS. 7 and 11).

The operable side plate 4 preferably has a projection 46 (see FIGS. 1 and 2) that is configured to contact the interface component 20 of the lock 14 and most preferably the lever portion 22 as the operable side plate 4 transitions from the open configuration toward the closed configuration and thereby actuate the first action of the lock 14 when the user closes the operable side plate 4. The operable side plate 4 preferably defines a recess 48 (see FIGS. 1 and 2) that is configured to receive the interface component 20 as the operable side plate 4 transitions from the open configuration toward the closed configuration, thereby allowing the first action of the lock 14 to complete without the operable side plate 4 interfering with the motion of the lock 14. The interface component 20 preferably has a ramp region 50 (see FIGS. 1 and 2) that is configured to contact the inner surface of the bridge portion 44 as the bridge portion 44 slides over the lock 14 when the operable side plate 4 transitions from the open configuration to the closed configuration. When the first action of the lock 14 is complete (see FIG. 4) during the closing process (i.e., when the interface component 20 is received in the recess 48 during the closing process), the ramp region 50 preferably resides on a plane that is parallel or substantially parallel to the leading edge 52 of the bridge portion 44 at the moment in time that the leading edge 52 first contacts the ramp region 50 during the closing process. Accordingly, the bridge portion 44 is preferably configured to actuate the second action of the lock 14 after the projection 46 actuates the first action of the lock 14 as the user closes the operable side plate 4, thereby transitioning the lock 14 to the unlocked configuration and, thus, allowing the user to complete the transition from the open configuration to the closed configuration.

Figure 2:
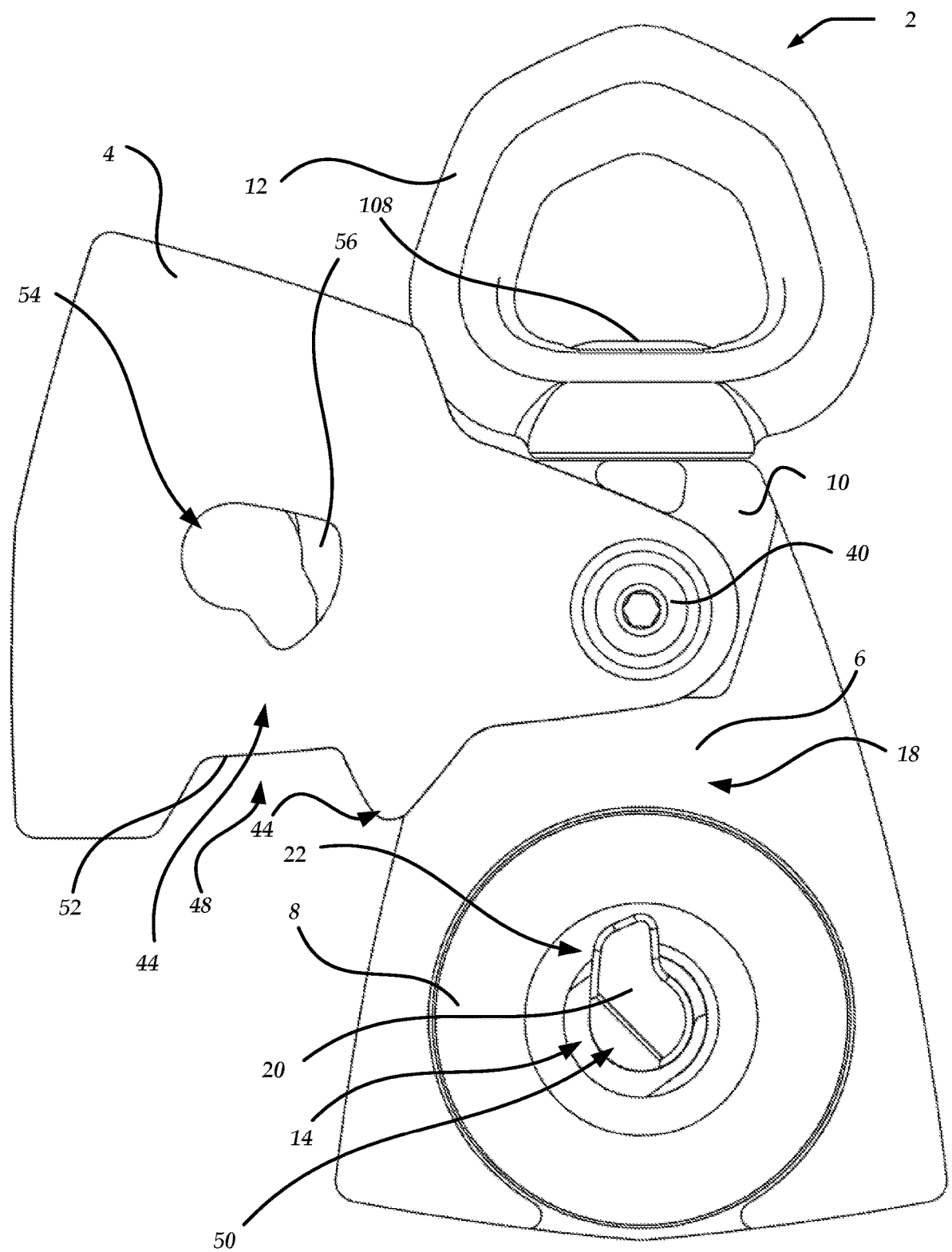
FIG. 2 is a front-side elevational view of the pulley of FIG. 1, showing the operable side plate in an open configuration.

The operable side plate 4 preferably defines an interface component aperture 54 that is configured to receive the interface component 20 of the lock 14 (see FIGS. 1 and 2). The operable side plate 4 preferably has a pivot-prevention flange 56 disposed in the aperture 54. The flange 56 is preferably configured to be disposed between a portion of the lock 14, such as a portion of the interface component 20 (for example, the lever portion 22), and the fixed plate 6 when the operable side plate 4 is in the closed configuration and the lock 14 is in the default locked configuration (see FIG. 1). Accordingly, the flange 56 is preferably configured to prevent the operable side plate 4 from pivoting along a plane that is transverse to the outer face of the operable side plate 4. The flange 56 is preferably configured to allow the entirety of the lock 14 to be depressed beyond the inner surface of the operable side plate 4 when the second action of the lock 14 is complete (see FIG. 5).

Figure 11:
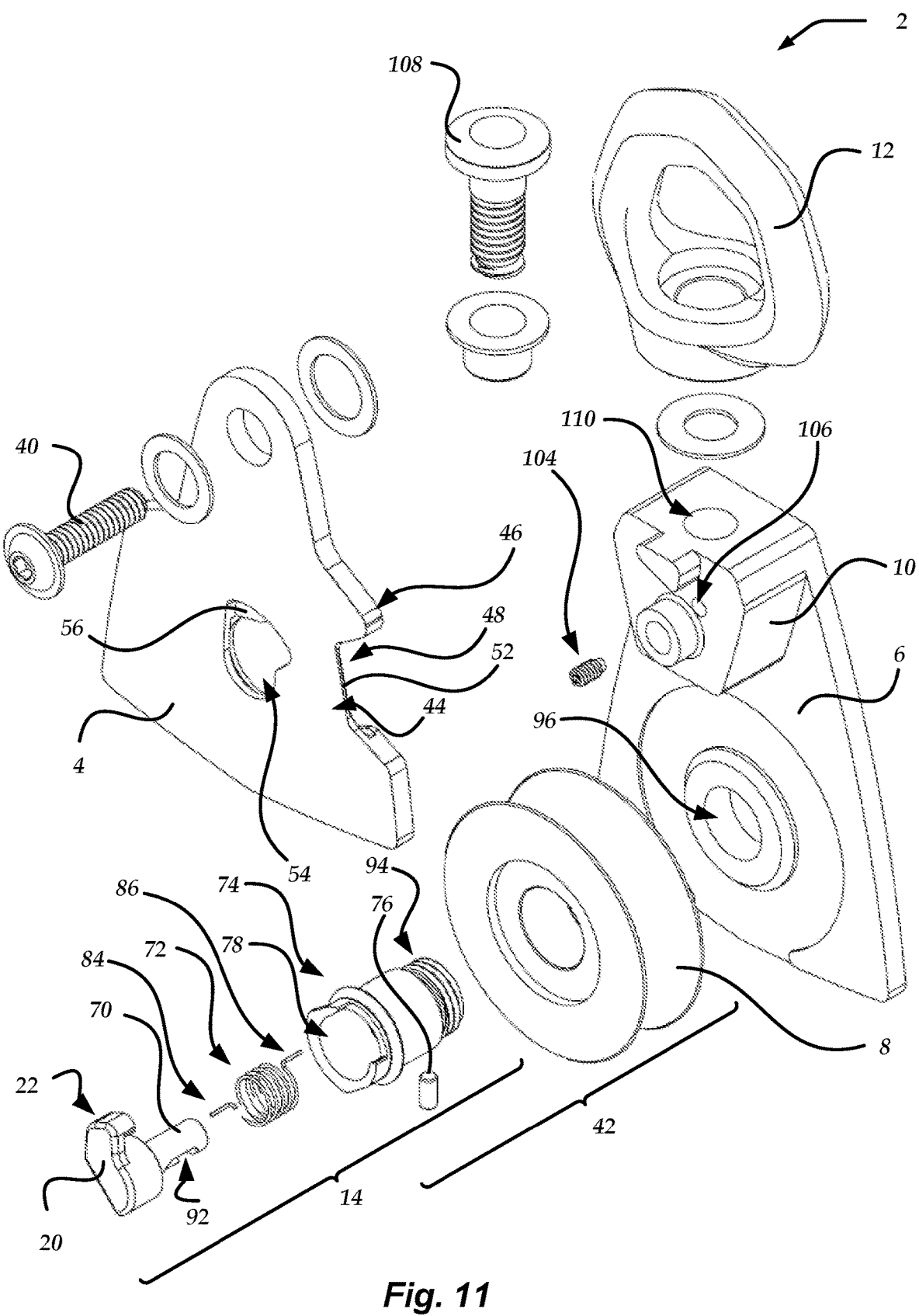
FIG. 11 is an isometric exploded view of the pulley of FIG. 1.
Figure 13:
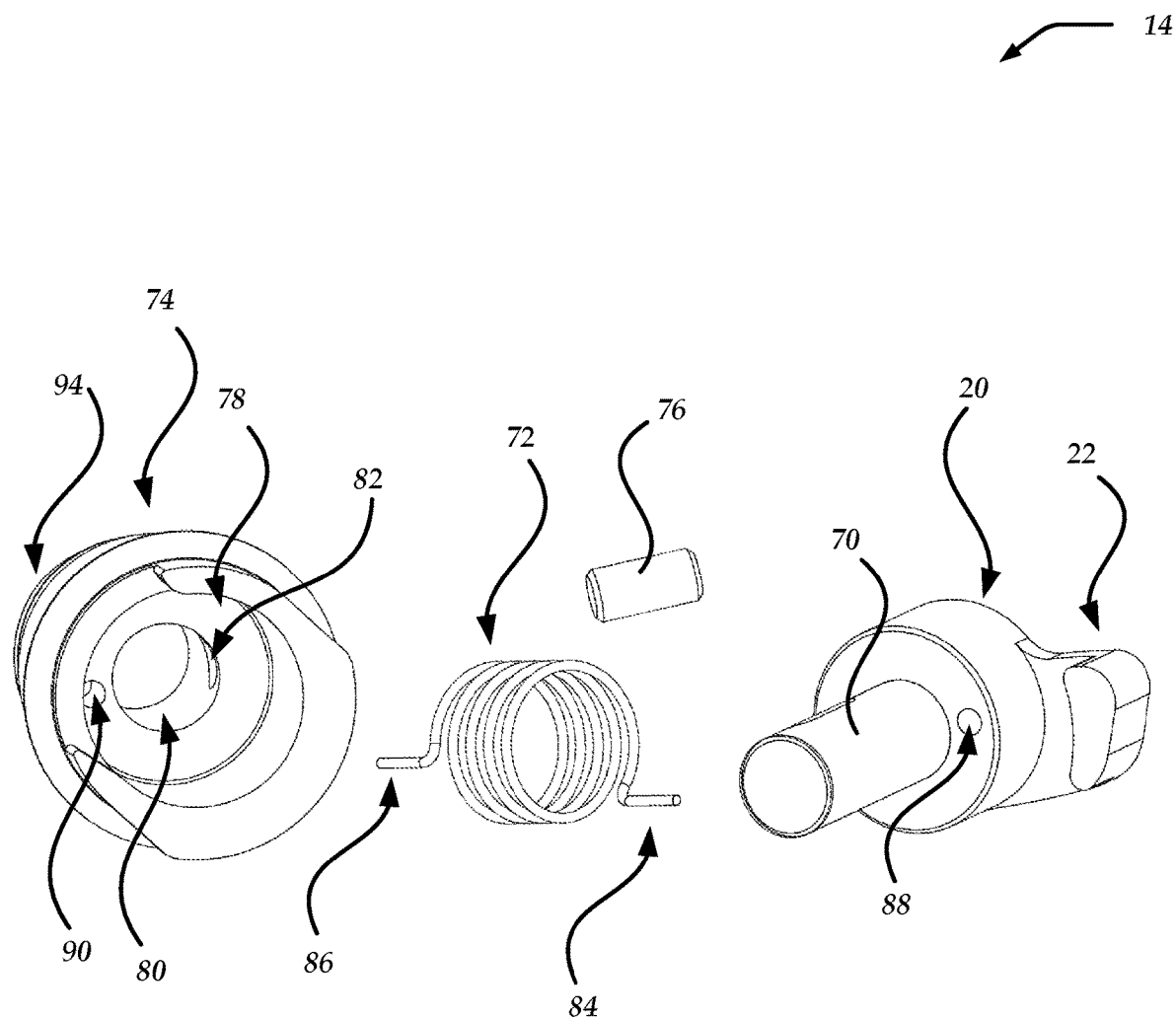
FIG. 13 is an isometric exploded view of the lock of the pulley of FIG. 1.
Figure 14:
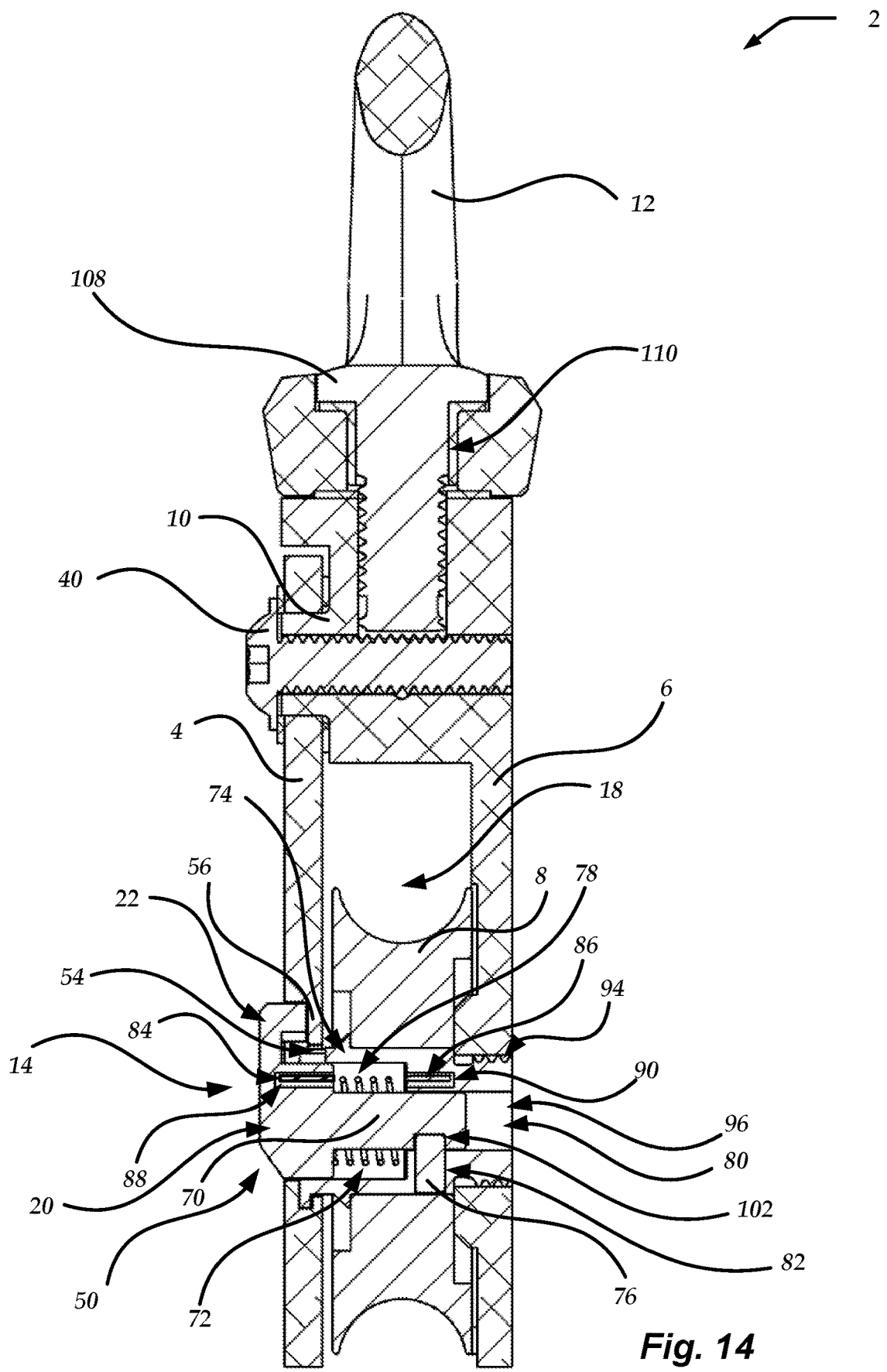
FIG. 14 is a cross-sectional view of the pulley of FIG. 1, along line 14-14 in FIG. 1 and showing the lock in the locked configuration with no actions initiated.

As shown in FIG. 11, the lock 14 preferably includes the interface component 20, a rod 70, a combination spring 72, a housing 74, and a pin 76. The rod 70 preferably extends from the interface component 20 toward the fixed plate 6 (see FIGS. 11-13). The combination spring 72 is preferably configured to receive the rod 70 inside the spring 72 and is preferably configured to fit inside the housing 74 (see FIGS. 14-16). The housing 74 is preferably configured to receive the spring 72 with the rod 70 in the spring 72 (see FIGS. 14-16). The housing 74 preferably defines an interface opening 78 and a rod opening 80 opposite the interface opening 78. The interface opening 78 is preferably configured to receive at least a portion of the interface component 20, such as when the second action is complete (see FIGS. 11 and 13-16). The rod opening 80 is preferably configured to receive at least a portion of the rod 70, such as when the second action is complete (see FIGS. 12-16). The housing 74 preferably defines a pin opening 82 that is configured to receive the pin 76 (see FIGS. 12 and 13). The pin opening 82 preferably connects to the rod opening 80 and thereby facilitates the pin 76 extending into the rod opening 80 (see FIG. 13). In some versions, the pin 76 is integral to the housing 74, and the pin opening 82 is omitted. The combination spring 72 preferably has an operable end portion 84 and a fixed end portion 86 (see FIGS. 11-13). The interface component 20 preferably defines a spring opening 88 that is configured to receive the operable end portion 84 of the spring 72 (see FIG. 13). The housing 74 preferably defines a spring opening 90 that is configured to receive the fixed end portion 84 of the spring 72 (see FIG. 13). The rod 70 preferably defines an indexed recess 92 (see FIG. 12) that is configured to receive the pin 76 when the rod 70 and the pin 76 extend into the housing 74 and, most preferably, when they extend into the rod opening 80 (see FIGS. 14-16). The housing 74 preferably includes an attachment mechanism, such as male threads 94, that facilitates coupling the housing 74 to the fixed plate 6 in a manner that fixes the orientation and position of the housing 74 relative to the fixed plate 6 during use, such as female threads (not shown) in an opening 96 of the fixed plate 6. The lock housing 74 preferably defines a bearing, such as a plain bearing, for the sheave 8 (see FIGS. 11 and 14-16). In versions with multiple sheaves (not shown), partition plates (not shown) typically extend parallel to the side plates 4, 6 to partition swallows and breeches of the sheaves from each other yet with the partition plates extending only partially toward the crown 10 so that a bight may be slipped over the partition plates when the operable side plate 4 is in the open configuration.

Figure 12:
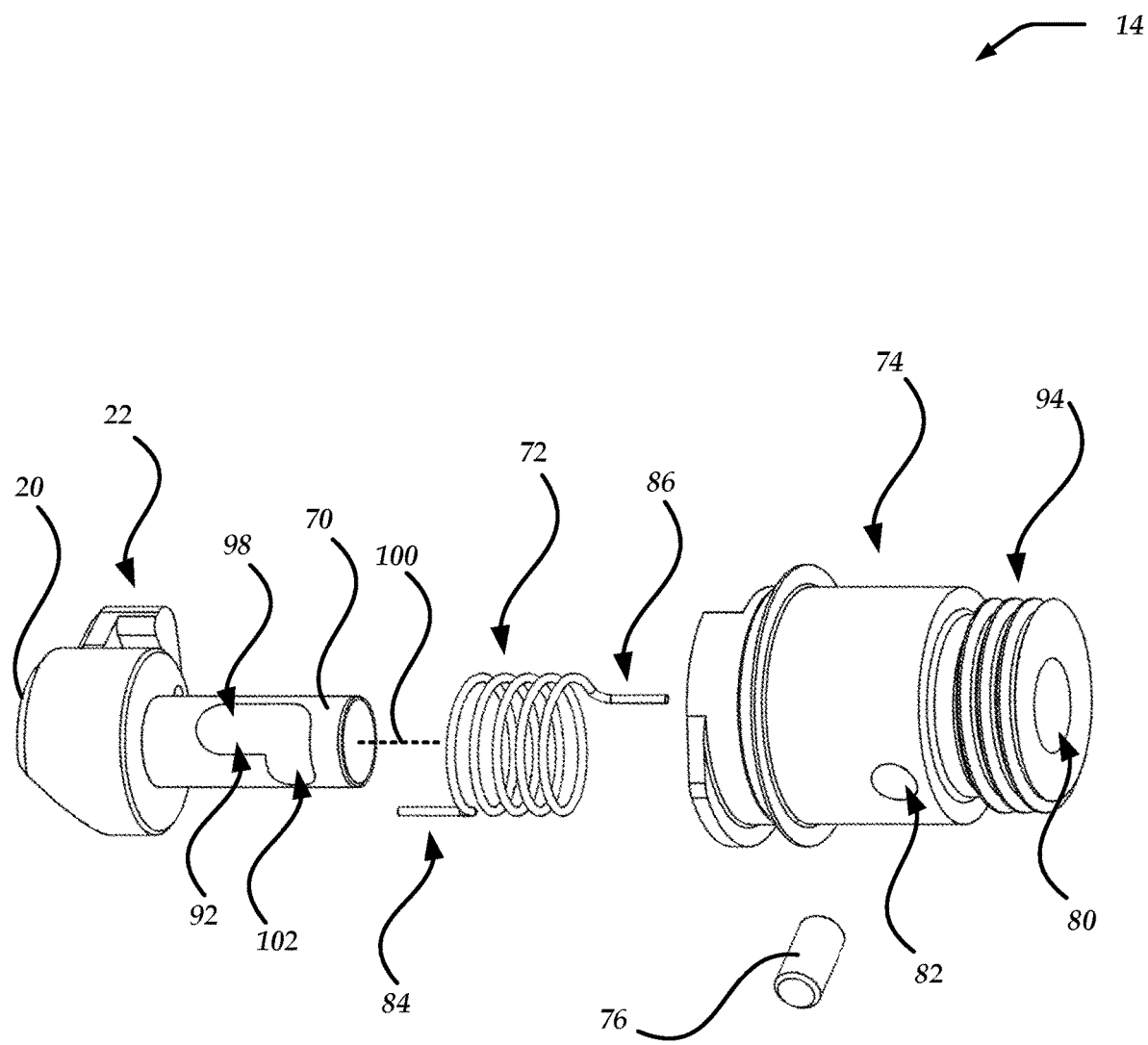
FIG. 12 is an isometric exploded view of the lock of the pulley of FIG. 1.

The indexed recess 92 preferably has an axial recess portion 98 that extends along the longitudinal axis 100 of the rod 70 and a circumferential recess portion 102 that is connected to and transverse to the axial recess portion 98 and, most preferably, extends along the circumference of the rod 70 (see FIG. 12). The combination spring 72 is preferably a torsion spring because it rotationally biases the interface component toward the default locked configuration (see FIG. 14). In the default locked configuration, the pin 76 is preferably disposed in the circumferential recess portion 102, thereby preventing depression of the interface component 20 and thus preventing actuation of the second action of the lock 14 (see FIG. 14). When the user applies sufficient force to the lever portion 22 of the interface component 20, the user preferably overcomes the torsion force of the spring 72 to initiate and then complete the first action of the lock 14 (see FIG. 15).

Figure 15:
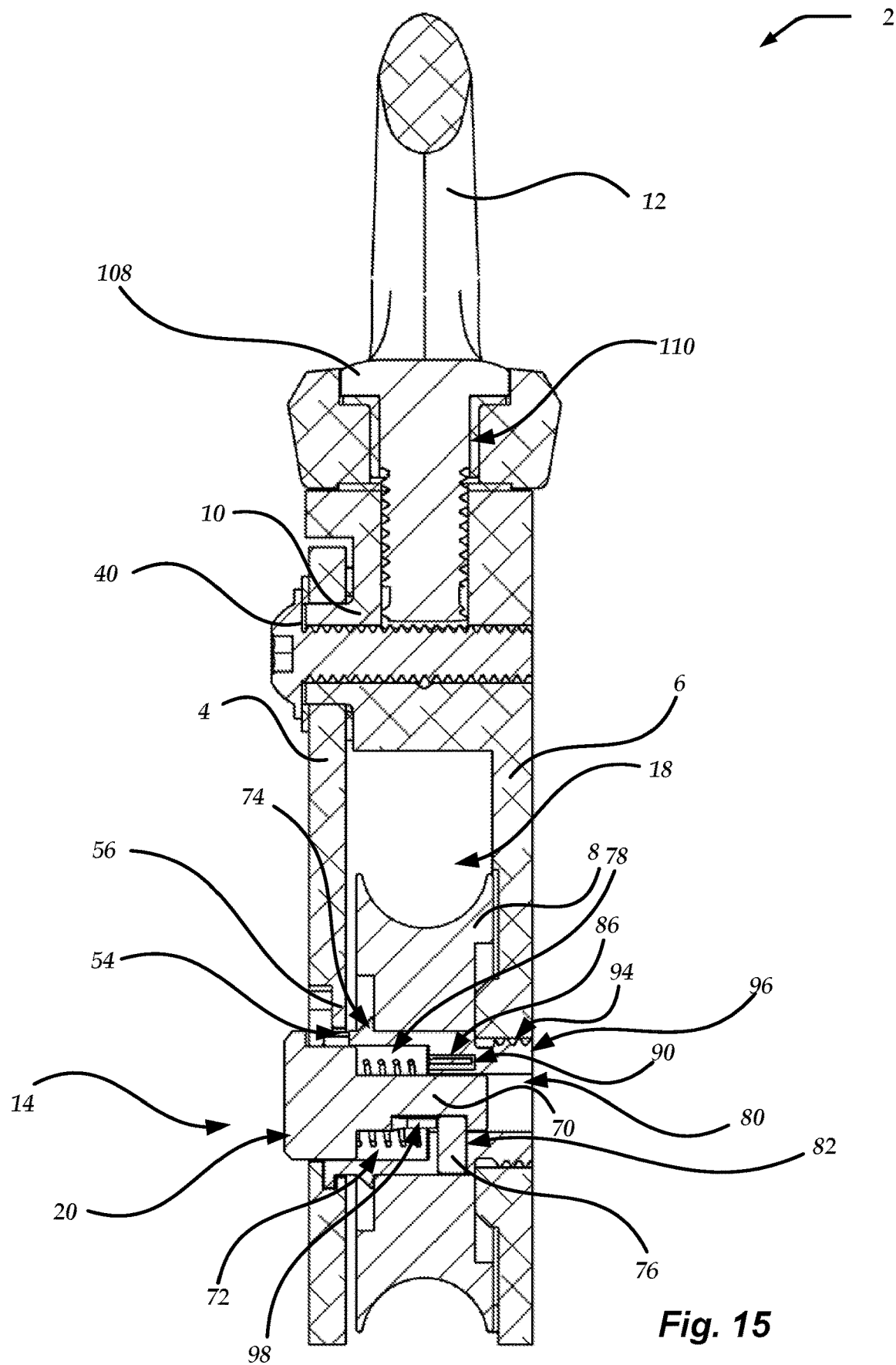
FIG. 15 is a cross-sectional view of the pulley of FIG. 1, along line 14-14 in FIG. 1 and showing the lock in the locked configuration with the first action complete.
Figure 16:
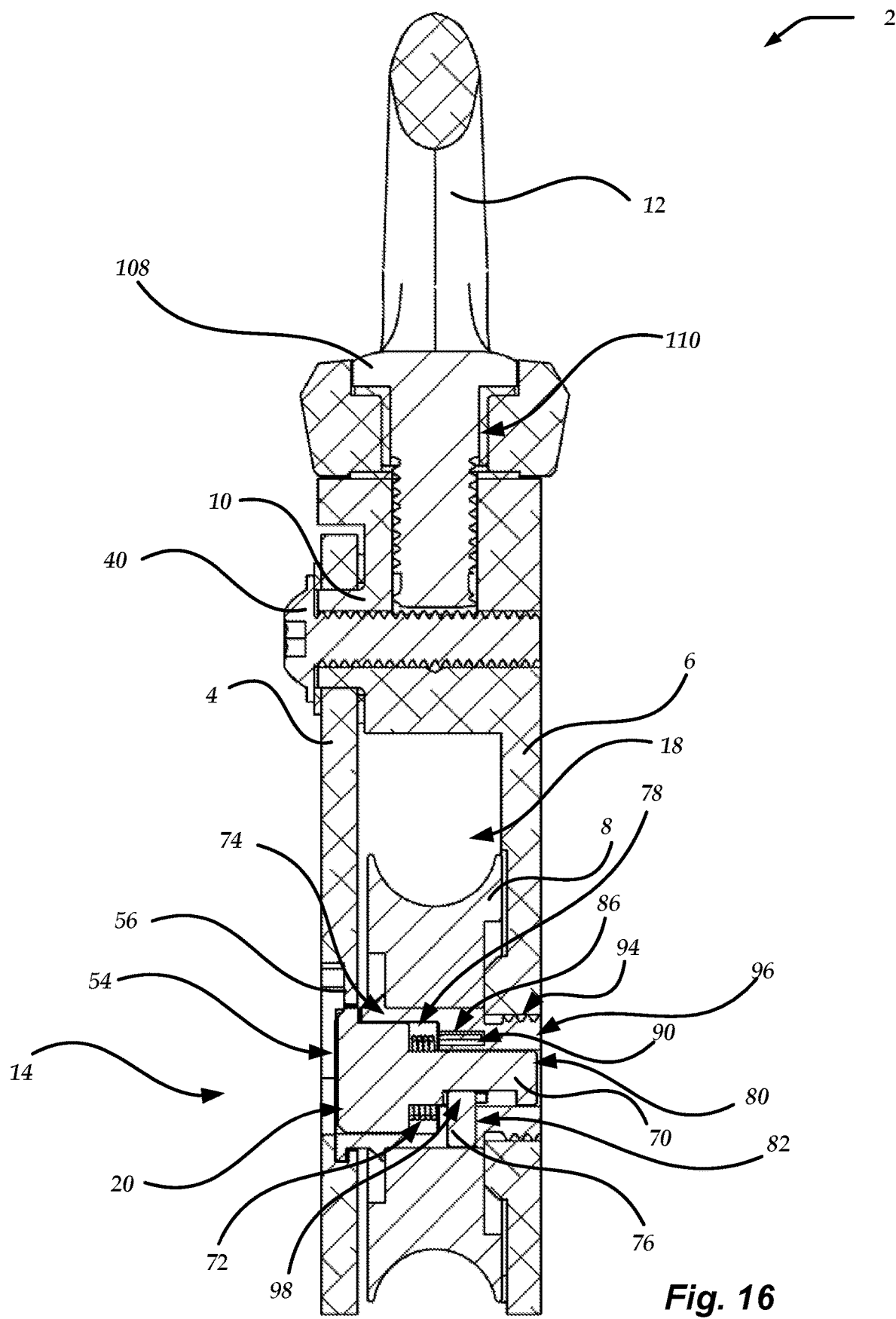
FIG. 16 is a cross-sectional view of the pulley of FIG. 1, along line 14-14 in FIG. 1 and showing the lock in the unlocked configuration with the second action complete.

The combination spring 72 is preferably also a compression spring because it expansively biases the interface component toward the locked configuration where the second action has not been initiated (see FIG. 15). Prior to initiation of the second action, the interface component 20 preferably extends into or through the aperture 54 by a sufficient distance to interfere with the path of a portion of the operable side plate 4, such as the bridge portion 44 of the operable side plate 4, when the operable side plate 4 is in the closed configuration, thereby preventing transitioning the operable side plate 4 into the open configuration (see FIGS. 4 and 15). When the first action is complete, the pin 76 is preferably disposed in the axial recess portion 98, thereby enabling depression of the interface component 20 and thus enabling initiation of the second action of the lock 14 (see FIG. 15). Accordingly, after completion of the first action, the user preferably may depress the interface component 20 (see FIG. 16). When the user applies sufficient force to the interface component 20, the user preferably overcomes the expansion force of the spring 72 to initiate and then complete the second action of the lock 14 (see FIG. 16). When the second action is complete, the interface component 20 is preferably depressed entirely or partially out of the aperture by a sufficient distance to avoid interfering with the path of the previously blocked portion of the operable side plate, such as the bridge portion 44 (see FIGS. 5 and 16).

The pulley 2 preferably has a swivel-retention mechanism 104, such as a screw (see FIG. 11). The pulley 2 preferably has a corresponding opening 106 disposed in the crown 10 that is configured to receive the swivel-retention mechanism 104 (see FIG. 11). The pulley 2 preferably has a bolt or swivel 108. The pulley preferably has a corresponding opening 110 disposed in the crown 10 that is configured to receive the swivel 108. The swivel 108 preferably rotatably couples the thimble 12 to the crown 10. The swivel-retention mechanism 104 preferably facilitates retaining the swivel 108 in the opening 110 by catching a flange at the bottom end portion of the swivel 108.

Figure 17:
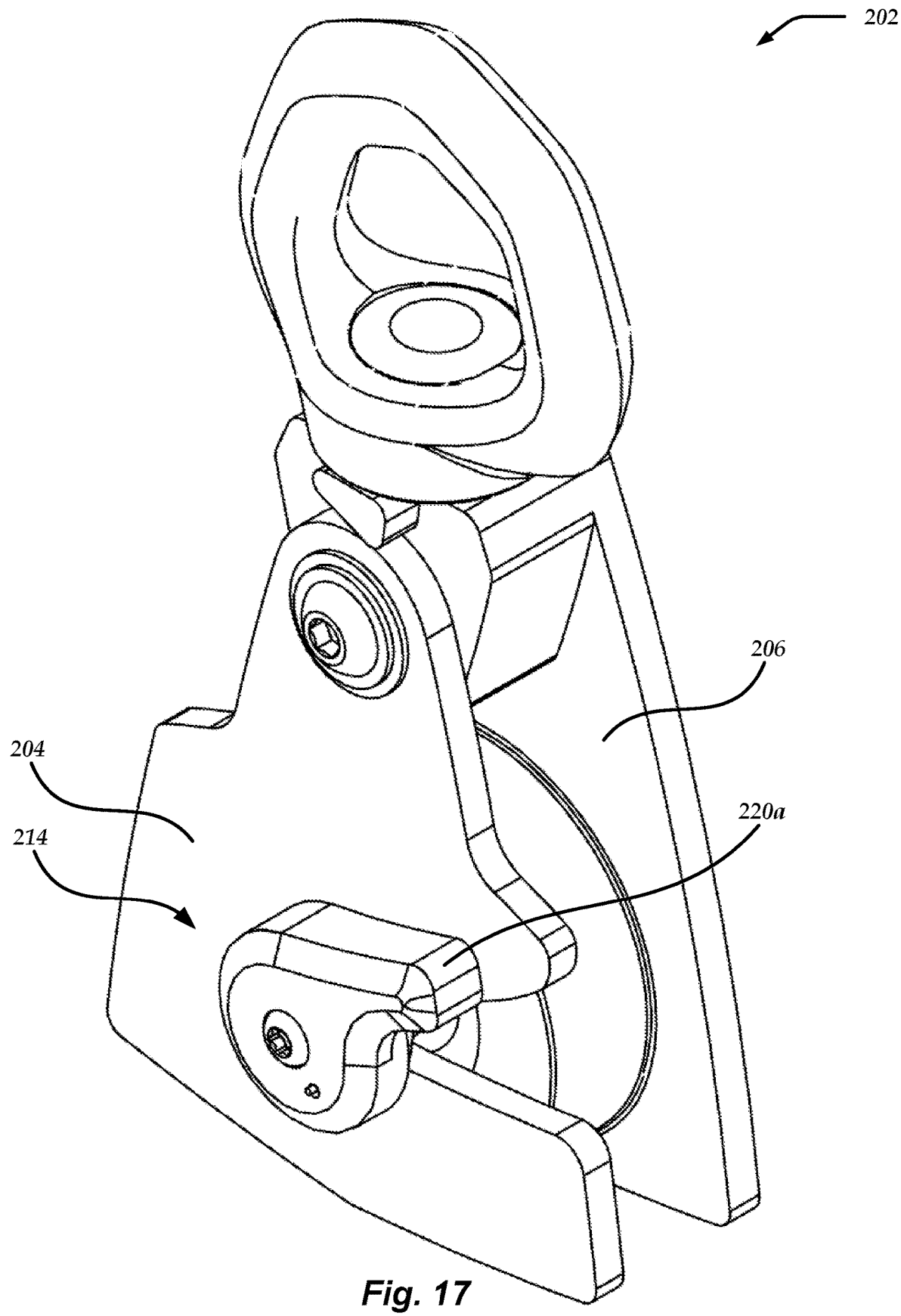
FIG. 17 is a front, left isometric view of another pulley having an operable side plate and a double-action lock according to the invention, showing the operable side plate in the closed configuration and the lock in the locked configuration with no actions initiated.
Figure 18:
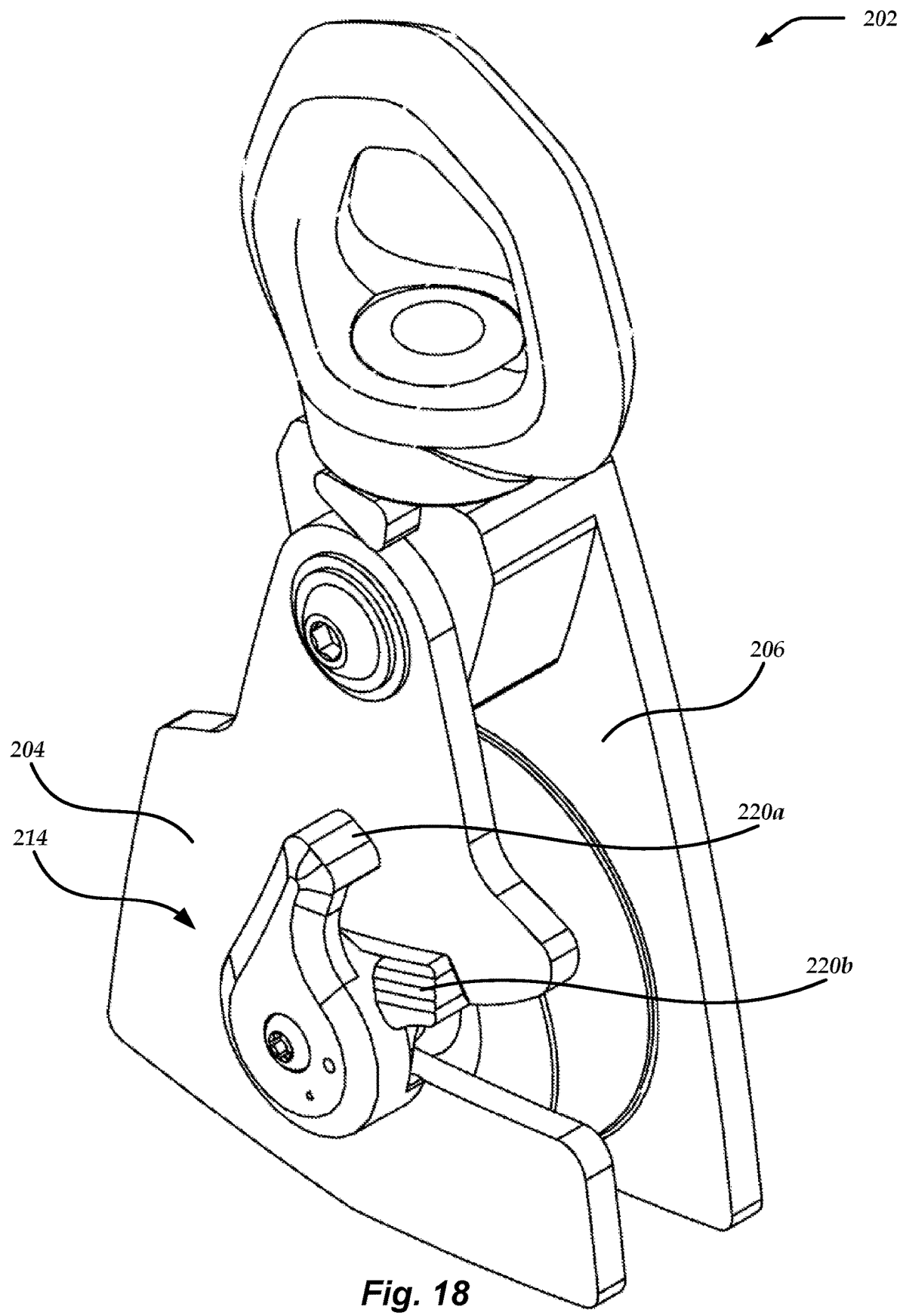
FIG. 18 is a front, left isometric view of the pulley of FIG. 17, showing the lock in the locked configuration with a first action complete.
Figure 19:
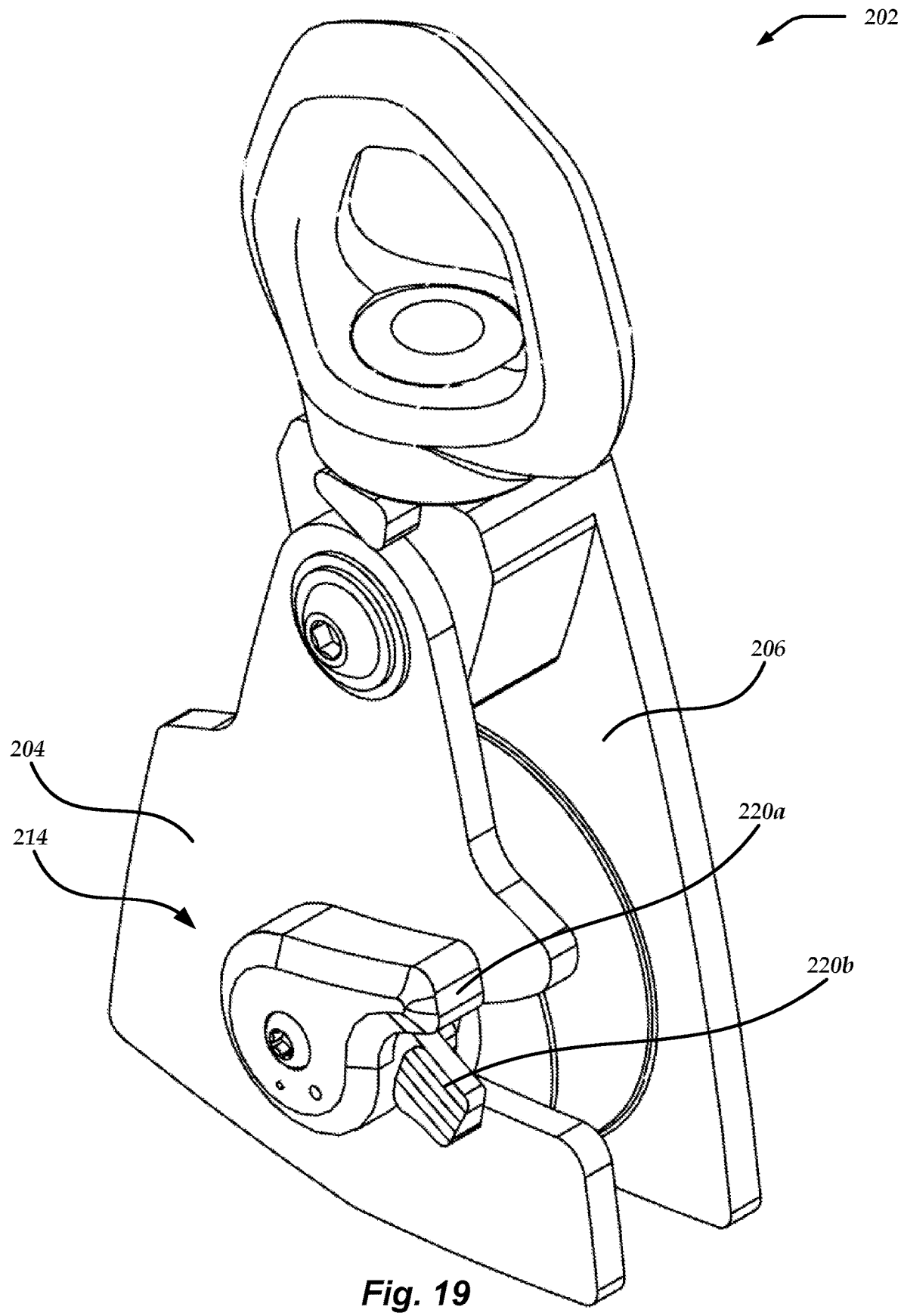
FIG. 19 is a front, left isometric view of the pulley of FIG. 17, showing the lock in the unlocked configuration with a second action complete.

Another pulley 202 in accordance with the principles of the invention is shown in FIG. 17. The pulley 202 has many components, configurations, and functions in common with the pulley 2, and those common components, configurations, and functions may be understood by referencing the detailed disclosure regarding the pulley 2 and are incorporated by reference again herein as if directed toward the pulley 202. The pulley 202 has an operable side plate 204, a fixed side plate 206, and a double-action lock 214. The lock 214 preferably requires two separate and distinct actions to be completed (see FIGS. 18 and 19), one (see FIG. 18) before the other (see FIG. 19), to transition the lock 214 from the locked configuration to the unlocked configuration. The lock 214 preferably has two interface components, such as an outer interface component 220a and an inner interface component 220b (for example, a lever, slide, grip, or button) (see FIG. 18). Actuating the outer interface component 220a preferably executes the first action of the lock 214 (see FIG. 18). The outer interface component 220a preferably prevents user access to the inner interface component 220b until the first action of the lock 214 is complete (contrast the default locked configuration of FIG. 17 with FIG. 18, which shows the first action being complete). Actuating the inner interface component 220b preferably executes the second action of the lock 214 (see FIG. 19), thereby transitioning the lock 214 from the locked configuration to the unlocked configuration. When the lock 214 is in the unlocked configuration, the user preferably may transition the operable side plate 204 from the closed configuration (see FIGS. 17-19) to the open configuration (see FIG. 20).

Figure 20:
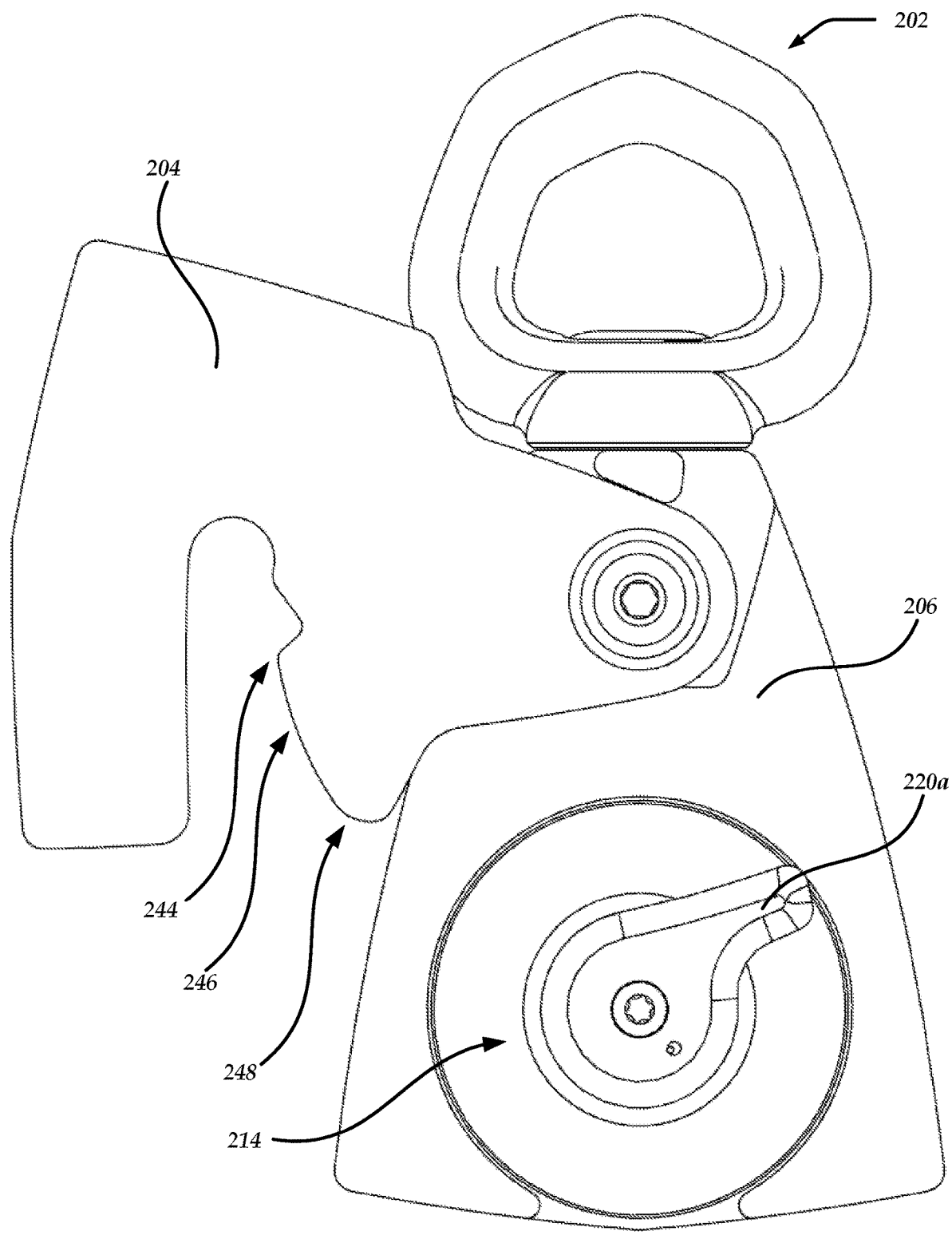
FIG. 20 is a front-side elevational view of the pulley of FIG. 17, showing the operable side plate in the open configuration.
Figure 21:
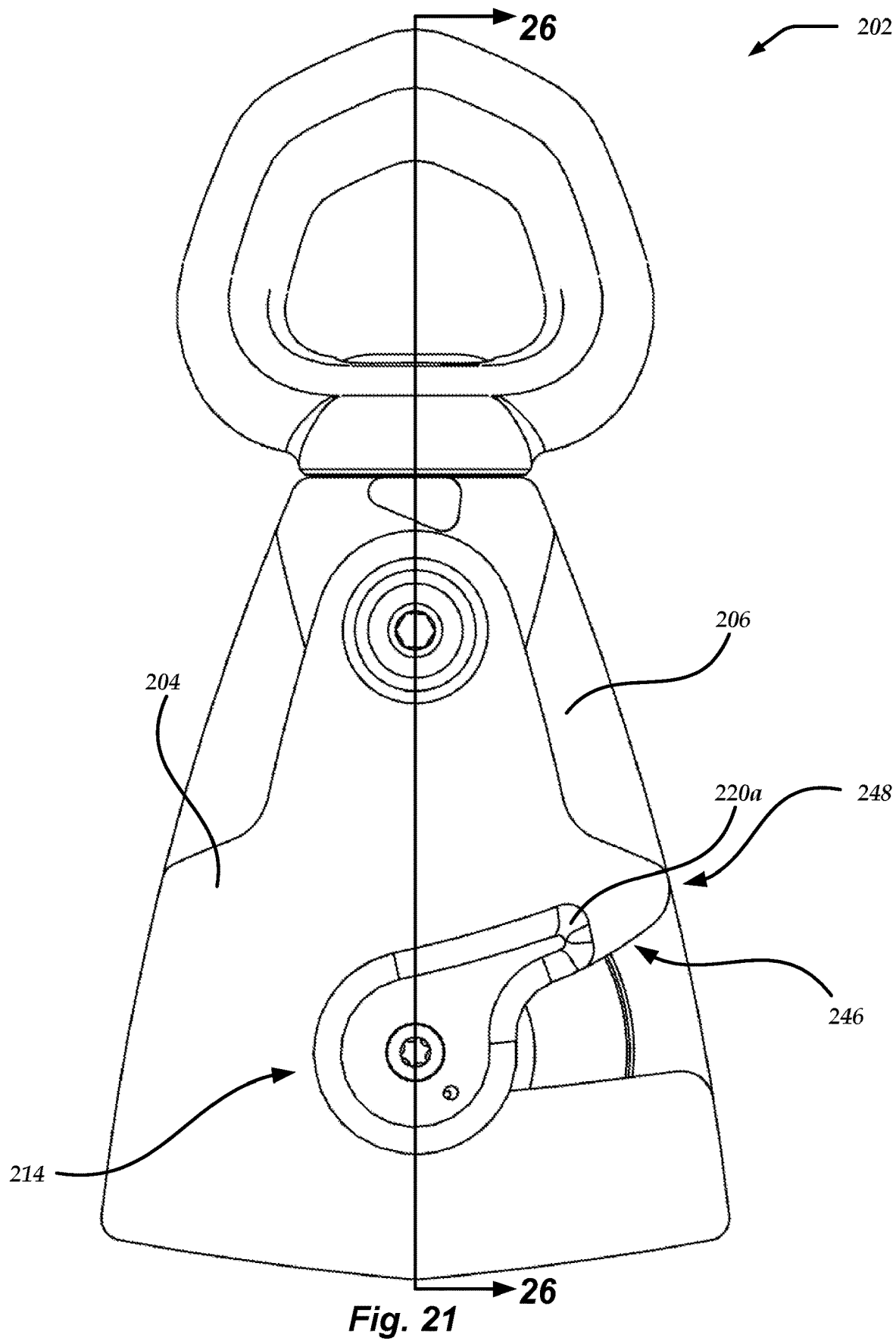
FIG. 21 is a front-side elevational view of the pulley of FIG. 17, showing the operable side plate in the closed configuration and the lock in the locked configuration with no actions initiated.
Figure 22:
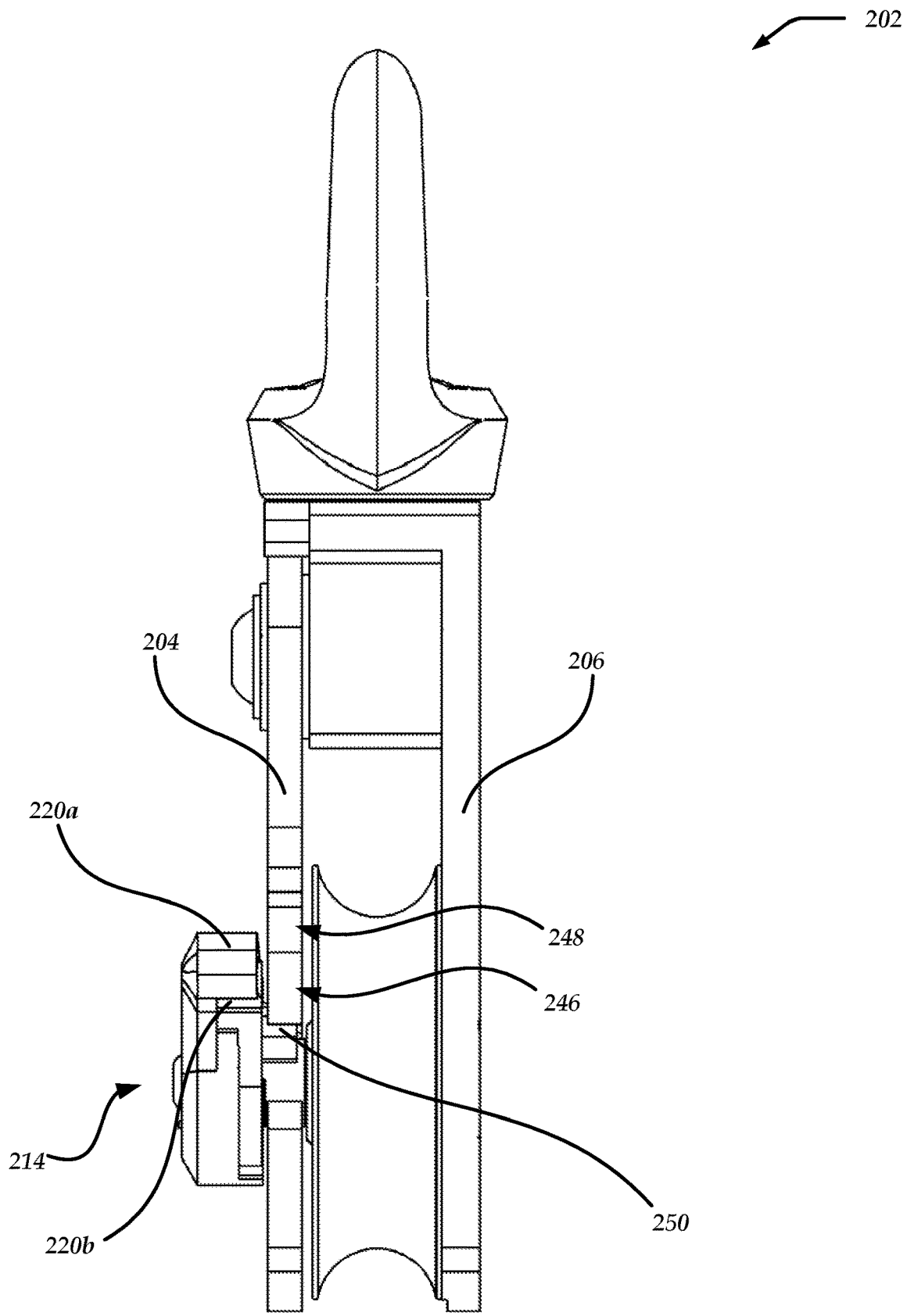
FIG. 22 is a left-side elevational view of the pulley of FIG. 17.
Figure 23:
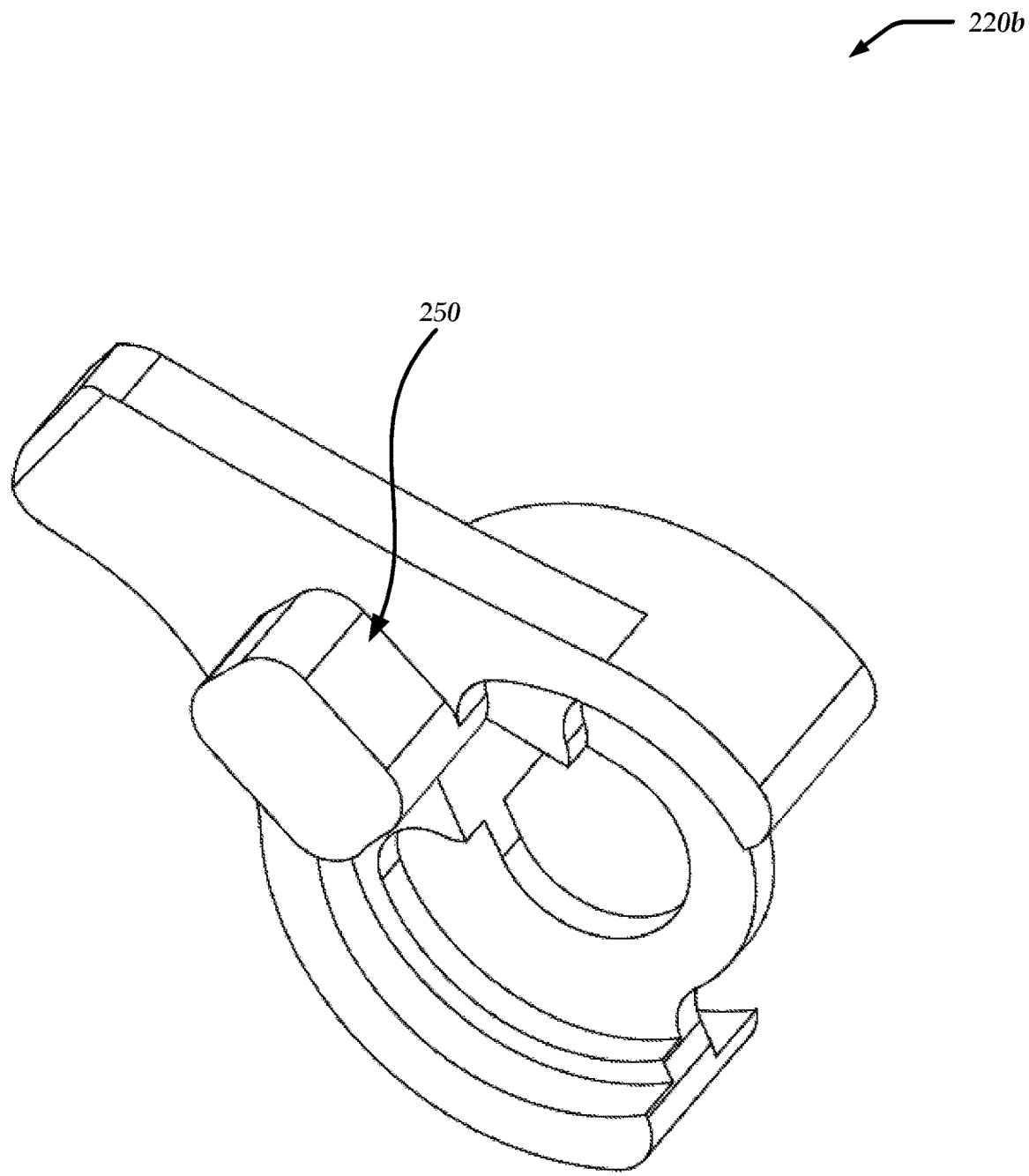
FIG. 23 is an isometric view of an interface component of the lock of the pulley of FIG. 17.

The operable side plate 204 is preferably devoid of a bridge portion (see FIGS. 20 and 21). The operable side plate 204 preferably defines one or more catches, such as catch 244 (see FIG. 20). The operable side plate 204 preferably defines a ramp region 246 that leads from a leading edge 248 of the operable side plate 204 to the catch 244 (see FIGS. 20 and 21). The inner interface component 220b preferably actuates a latch 250, such as a pawl (see FIGS. 22 and 23). The latch 250 preferably engages the catch 244 when the pulley 202 is in the closed and locked configuration. (see FIG. 22). The outer interface component 220a and the inner interface component 220b are preferably biased (for example, spring biased) toward the default locked configuration (see FIG. 21). The ramp region 246 is preferably configured to contact the latch 250 as the user transitions the operable side plate 204 from the open configuration toward the closed configuration, thereby actuating the second action without first actuating the first action during the closing process and, thus, allowing the user to complete the transition from the open configuration to the closed configuration. In the closed configuration, the latch 250 preferably engages the catch 244, thereby locking the operable side plate 204 in the closed configuration.

Figure 24:
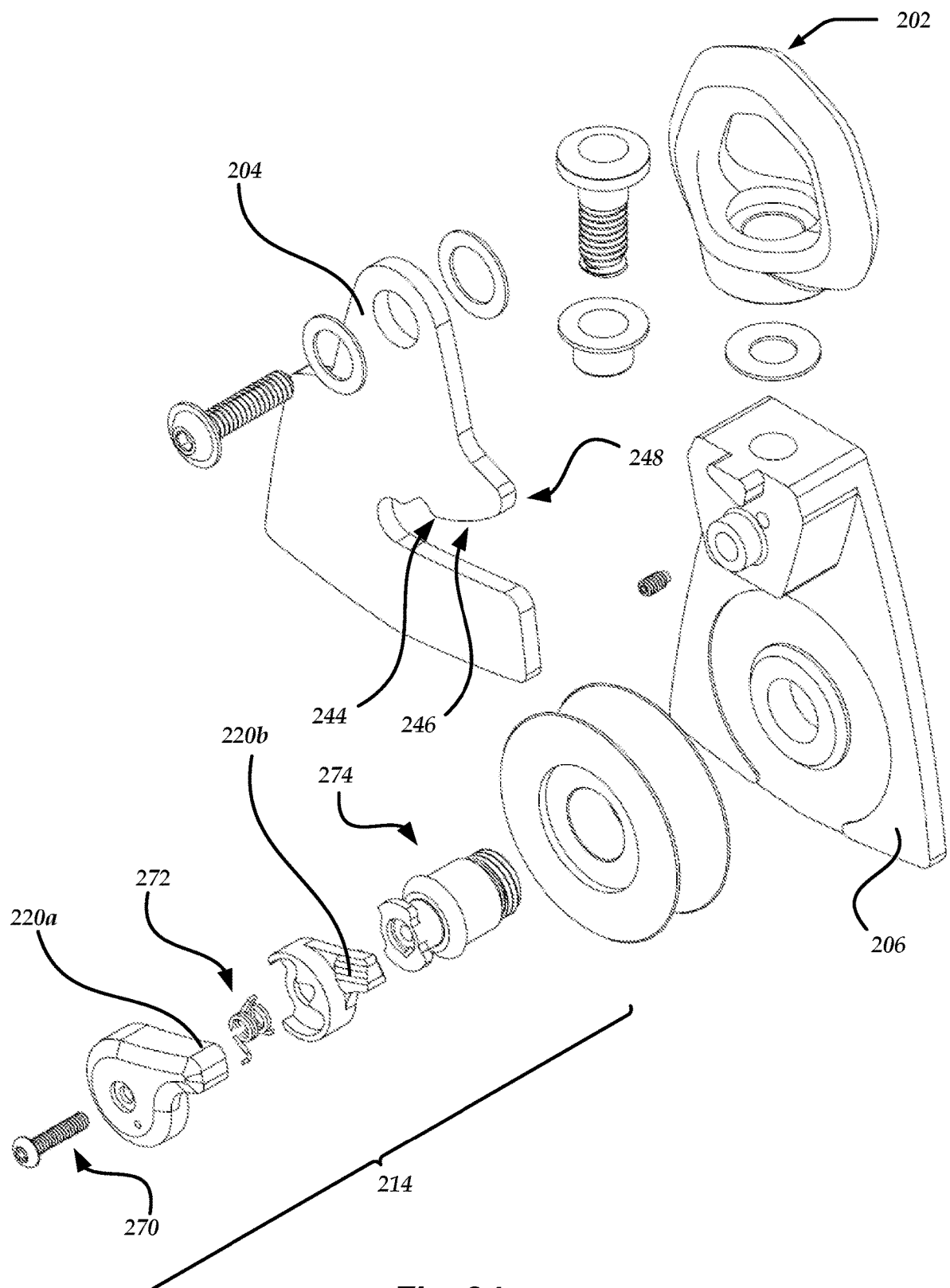
FIG. 24 is an isometric exploded view of the pulley of FIG. 17.
Figure 27:
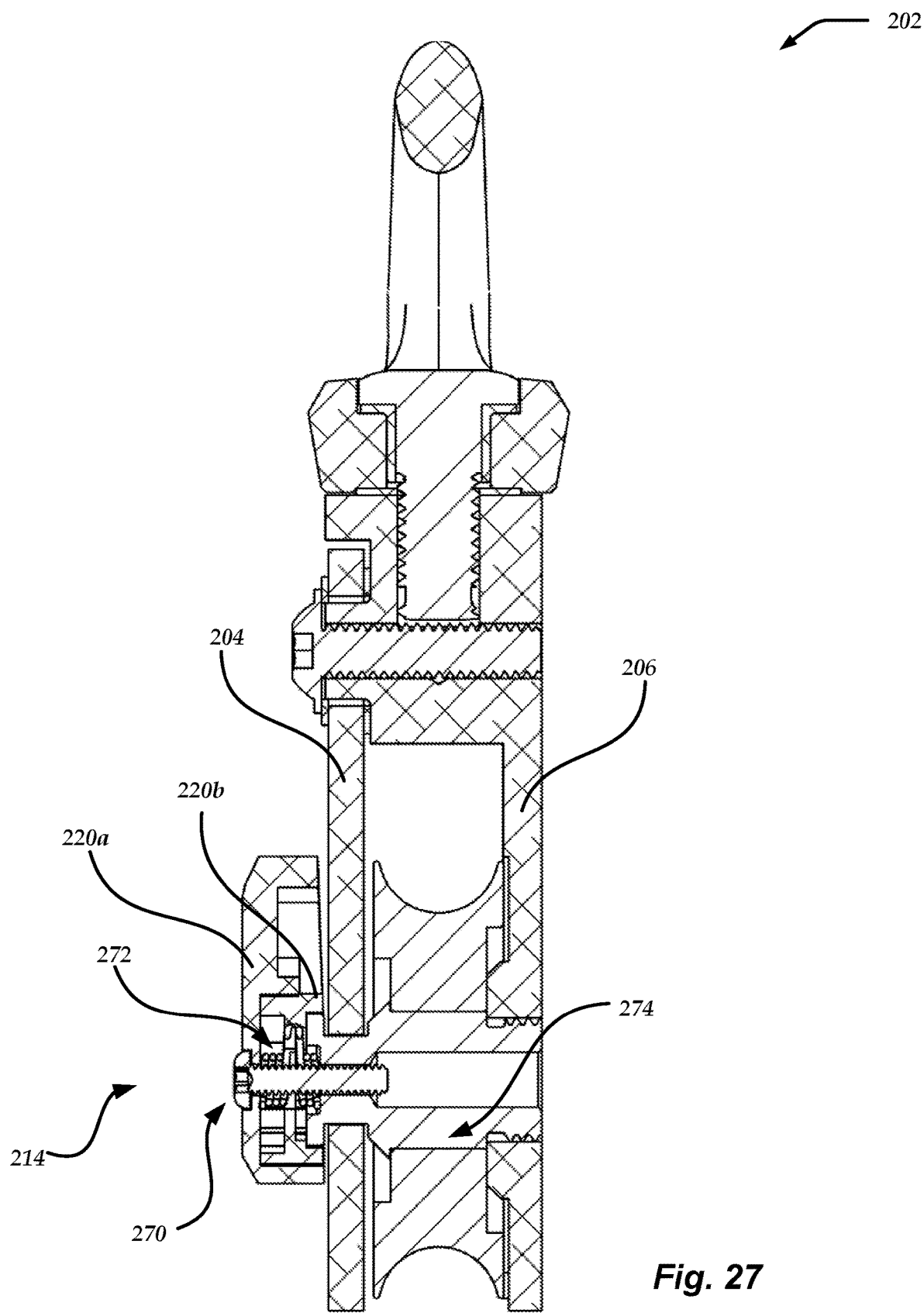
FIG. 27 is a cross-sectional view of the pulley of FIG. 17, taken along the line 26-26 in FIG. 21 and showing the lock in the locked configuration with the first action complete.
Figure 28:
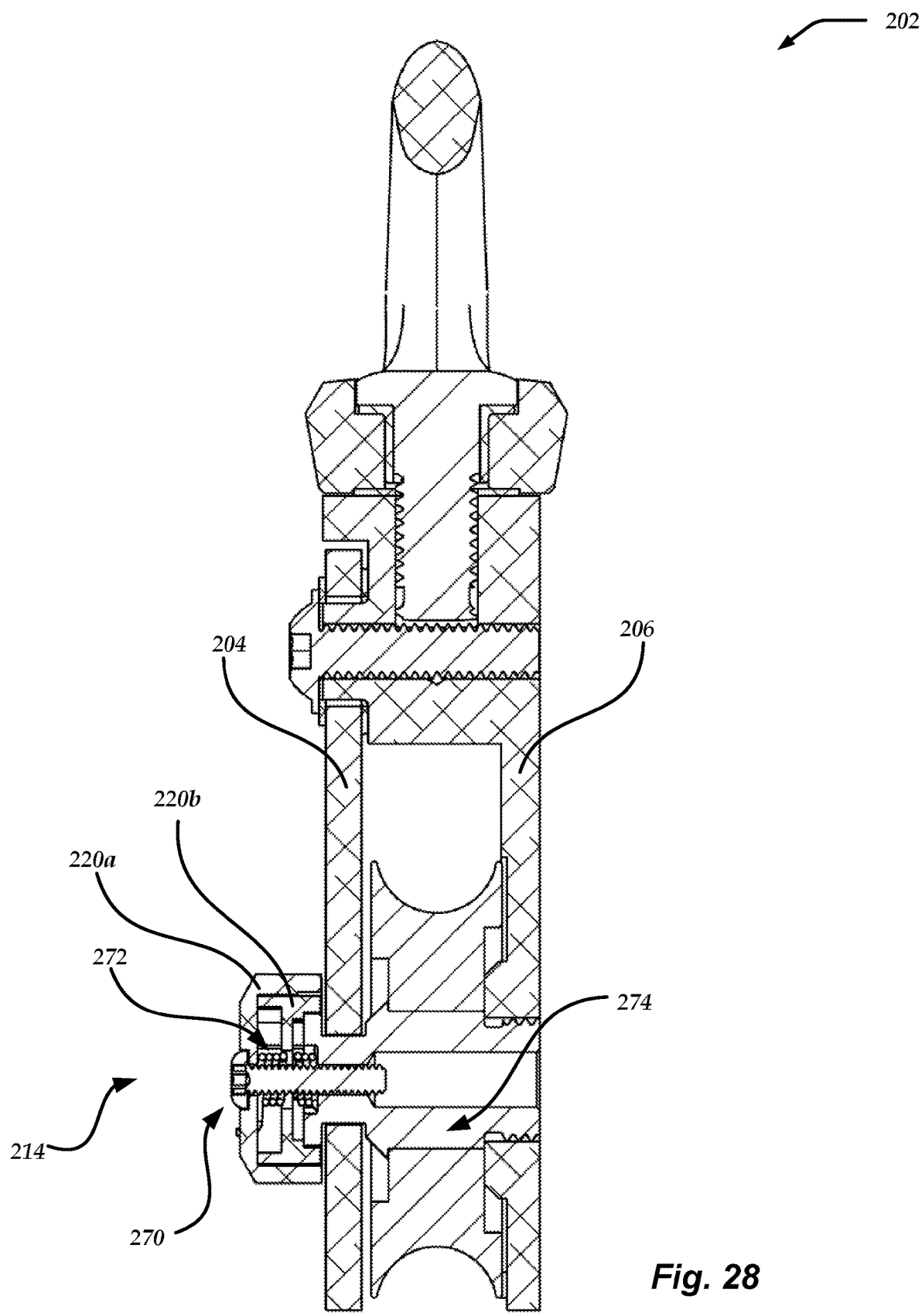
FIG. 28 is a cross-sectional view of the pulley of FIG. 17, taken along the line 26-26 in FIG. 21 and showing the lock in the unlocked configuration with the second action complete.

As shown in FIG. 24, the lock 214 preferably includes the outer interface component 220a, the inner interface component 220b, a rod or pin 270, a combination spring 272, and a housing 274. The rod 270 preferably extends from the outer interface component 220a, through the inner interface component 220b, and toward the fixed plate 206 (see FIGS. 24 and 27-29). The combination spring 272 is preferably configured to receive the rod 270 inside the spring 272 and is preferably configured to bias the inner interface component 220b toward the pre-actuated configuration while biasing the outer interface component 220a toward covering the inner interface component 220b (see FIG. 25). The housing 274 preferably defines a rod opening 278 that is configured to receive the rod 270, and, most preferably, the rod 270 is male threaded while the rod opening 278 is female threaded to facilitate coupling the rod 270 to the housing 274 (see FIGS. 27-29).

Figure 25:
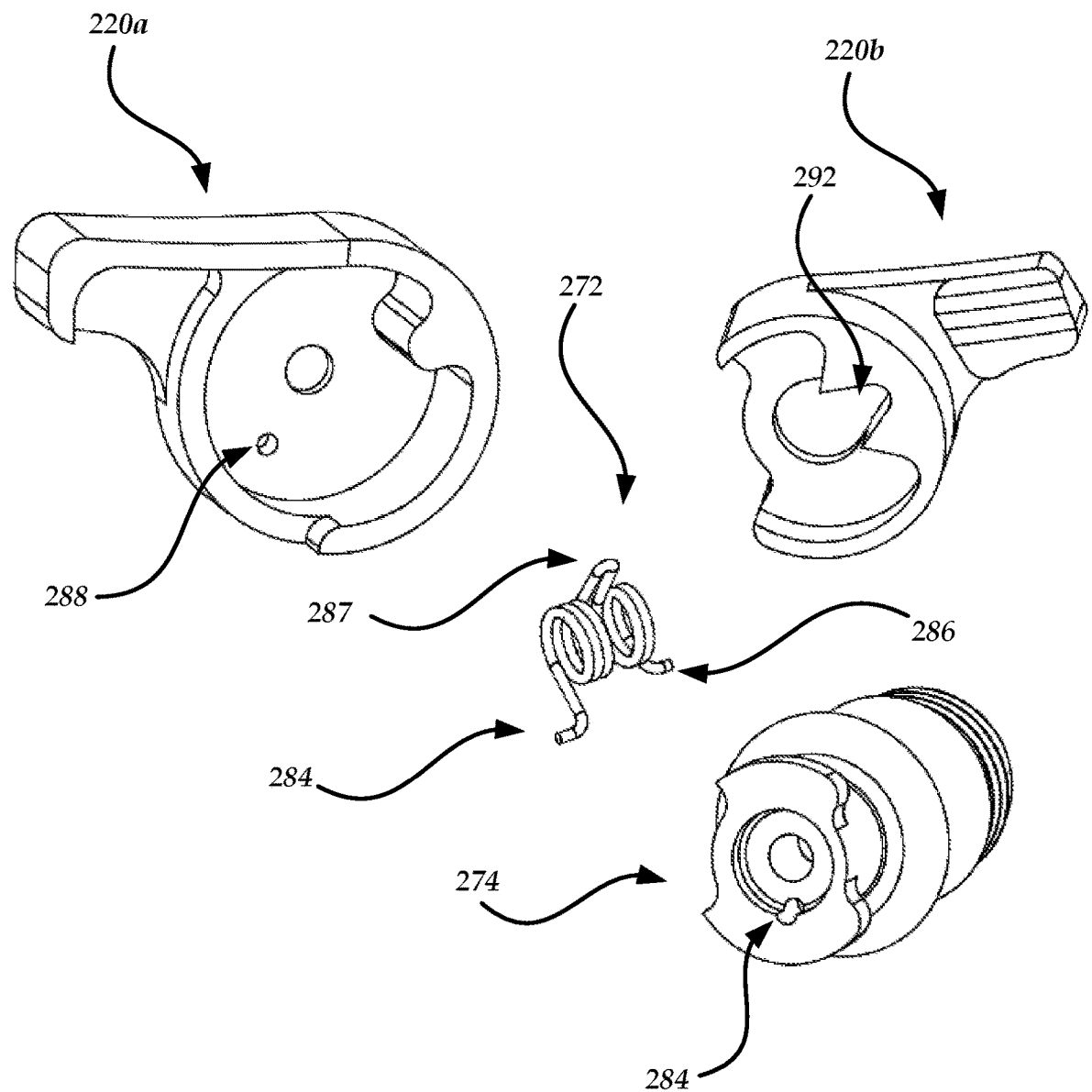
FIG. 25 is an isometric exploded view of components of the lock of the pulley of FIG. 17.
Figure 26:
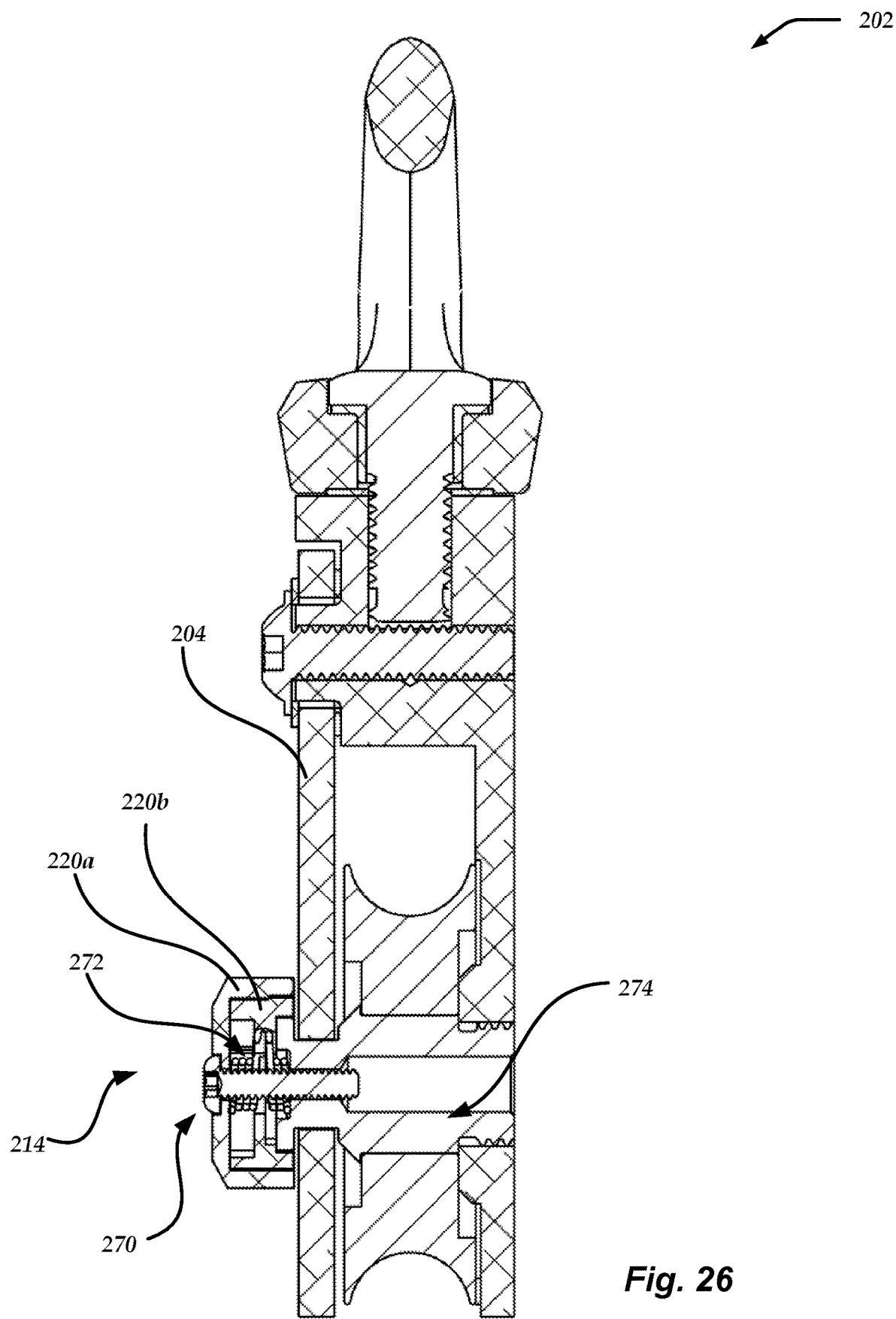
FIG. 26 is a cross-sectional view of the pulley of FIG. 17, taken along the line 26-26 in FIG. 21 and showing the lock in the locked configuration with no actions initiated.

The combination spring 272 preferably has an operable end portion 284 (for example, an axial pin or extension), a fixed end portion 286 (for example, an axial pin or extension), and an operable middle portion 287 such as a torsion arm (for example, a radial arm or extension) disposed between the operable end portion 284 and the fixed end portion 286 (see FIG. 25). The inner surface of the outer interface component 220a preferably defines a spring opening 288 that is configured to receive the operable end portion 284 of the spring 272 (see FIGS. 25 and 29). The housing 274 preferably defines a spring opening 290 that is configured to receive the fixed end portion 284 of the spring 272 (see FIG. 25). The inner interface component 220b preferably defines a spring recess 292 that is configured to receive the torsion arm 287 of the spring 272 (see FIGS. 25, 27, and 28). Accordingly, the combination spring 272 preferably torsionally biases the outer interface member 220a in a rotational direction (for example, clockwise) relative to the housing 274 and preferably torsionally biases the inner interface member 220b in an opposite rotational direction (for example, counterclockwise) relative to the housing (274) (see FIGS. 26-28). For this reason, the combination spring 272 is also referenced herein as a multi-directional torsion spring.

Figure 29:
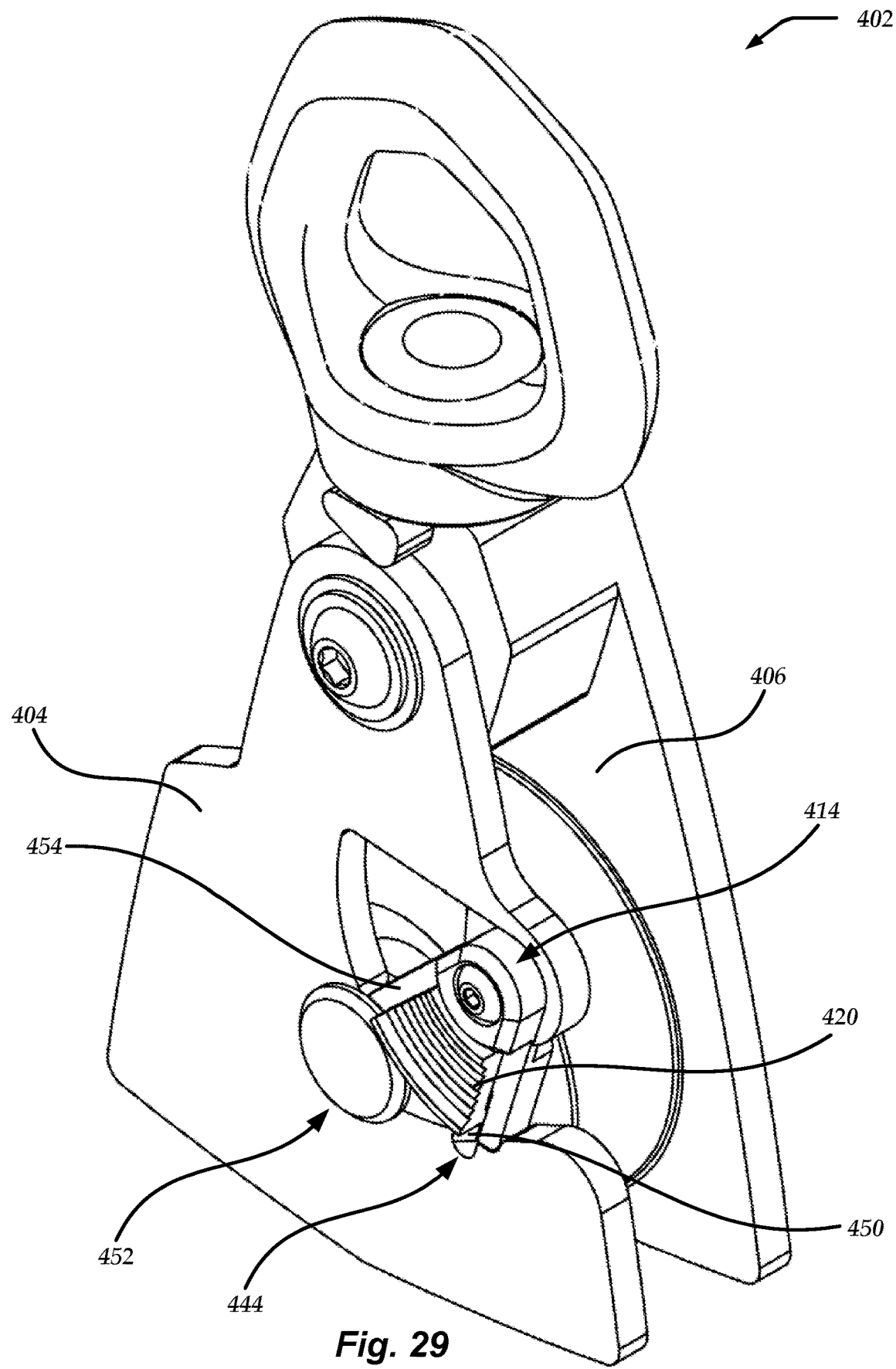
FIG. 29 is a front, left isometric view of another pulley having an operable side plate and a double-action lock according to the invention, showing the operable side plate in the closed configuration and the lock in the locked configuration with no actions initiated.
Figure 30:
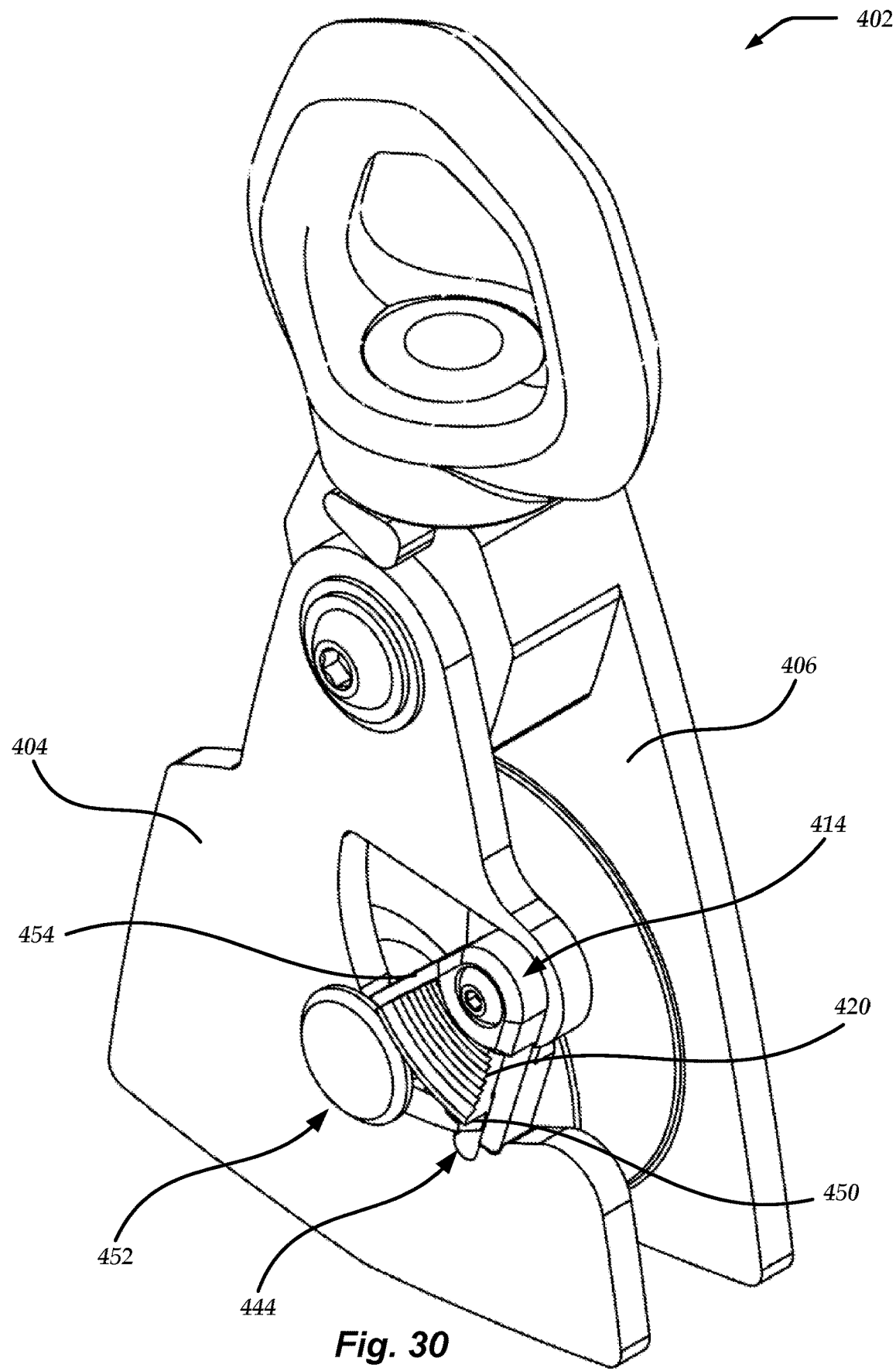
FIG. 30 is a front, left isometric view of the pulley of FIG. 29, showing the lock in the locked configuration with a first action complete.

A further pulley 402 in accordance with the principles of the invention is shown in FIG. 29. The pulley 402 has many components, configurations, and functions in common with one or more of the pulley 2 or the pulley 202, and those common components, configurations, and functions may be understood by referencing the detailed disclosure regarding one or more of the pulley 2 or the pulley 202 and are incorporated by reference again herein as if directed toward the pulley 402. The pulley 402 has an operable side plate 404, a fixed side plate 406, and a double-action lock 414. The lock 414 preferably requires two separate and distinct actions to be completed (see FIGS. 30 and 31), one (see FIG. 30) before the other (see FIG. 31), to transition the lock 414 from the locked configuration to the unlocked configuration. The lock 414 preferably has an interface component 420 (for example, a lever, slide, grip, or button) (see FIGS. 30 and 31). Sliding the interface component 420 preferably executes the first action of the lock 414 (see FIG. 30). The interface component 420 in the default configuration (see FIG. 29) preferably prevents actuation of the second action of the lock 414. Once the first action of the lock 414 is complete, the user preferably may pivot the interface component 420 to complete the second action, thereby transitioning the lock 414 from the locked configuration to the unlocked configuration (see FIG. 31). When the lock 414 is in the unlocked configuration, the user preferably may transition the operably plate 404 from the closed configuration (see FIGS. 29-31) to the open configuration (see FIG. 32).

Figure 31:
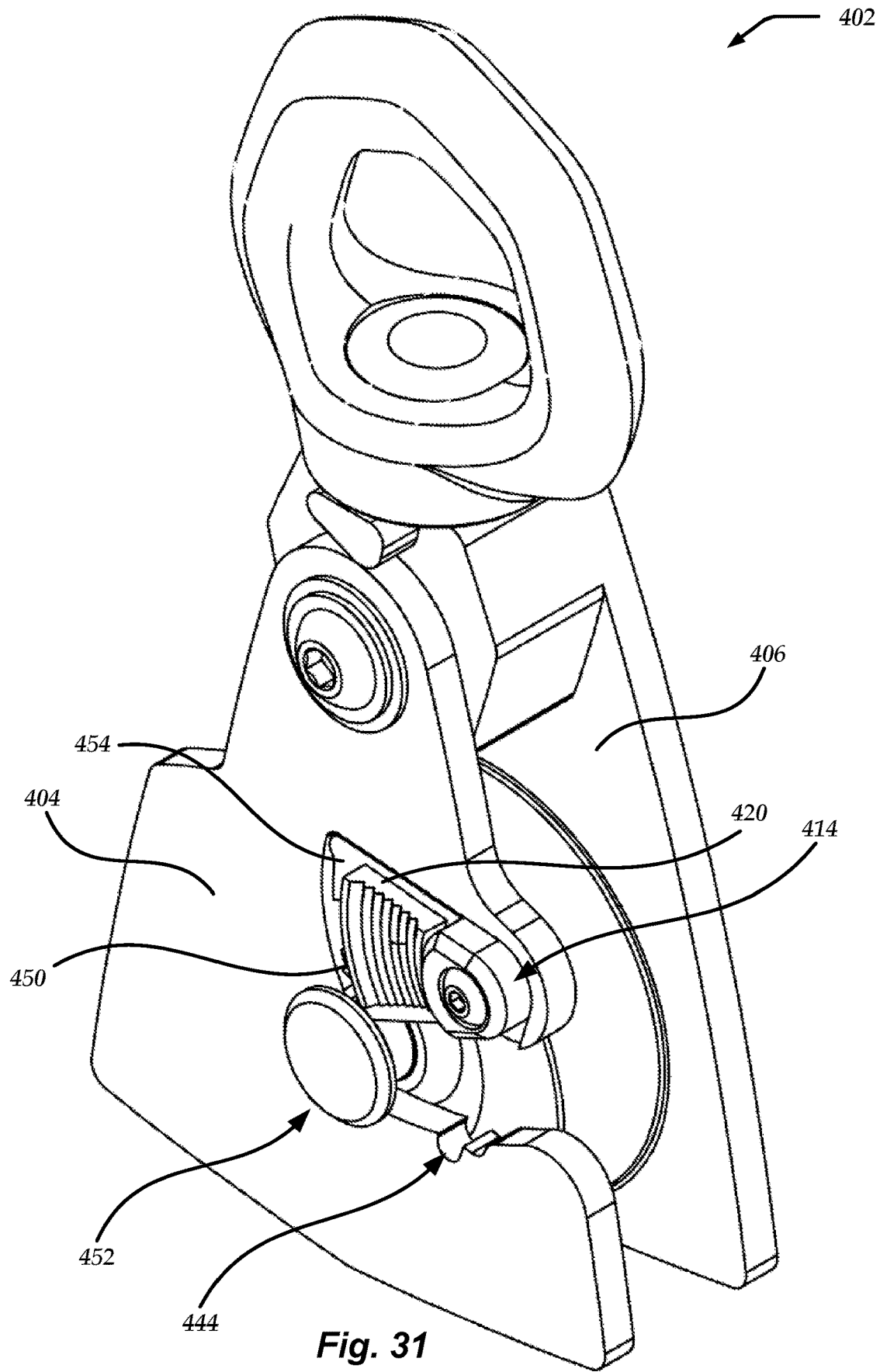
FIG. 31 is a front, left isometric view of the pulley of FIG. 29, showing the lock in the unlocked configuration with a second action complete.
Figure 32:
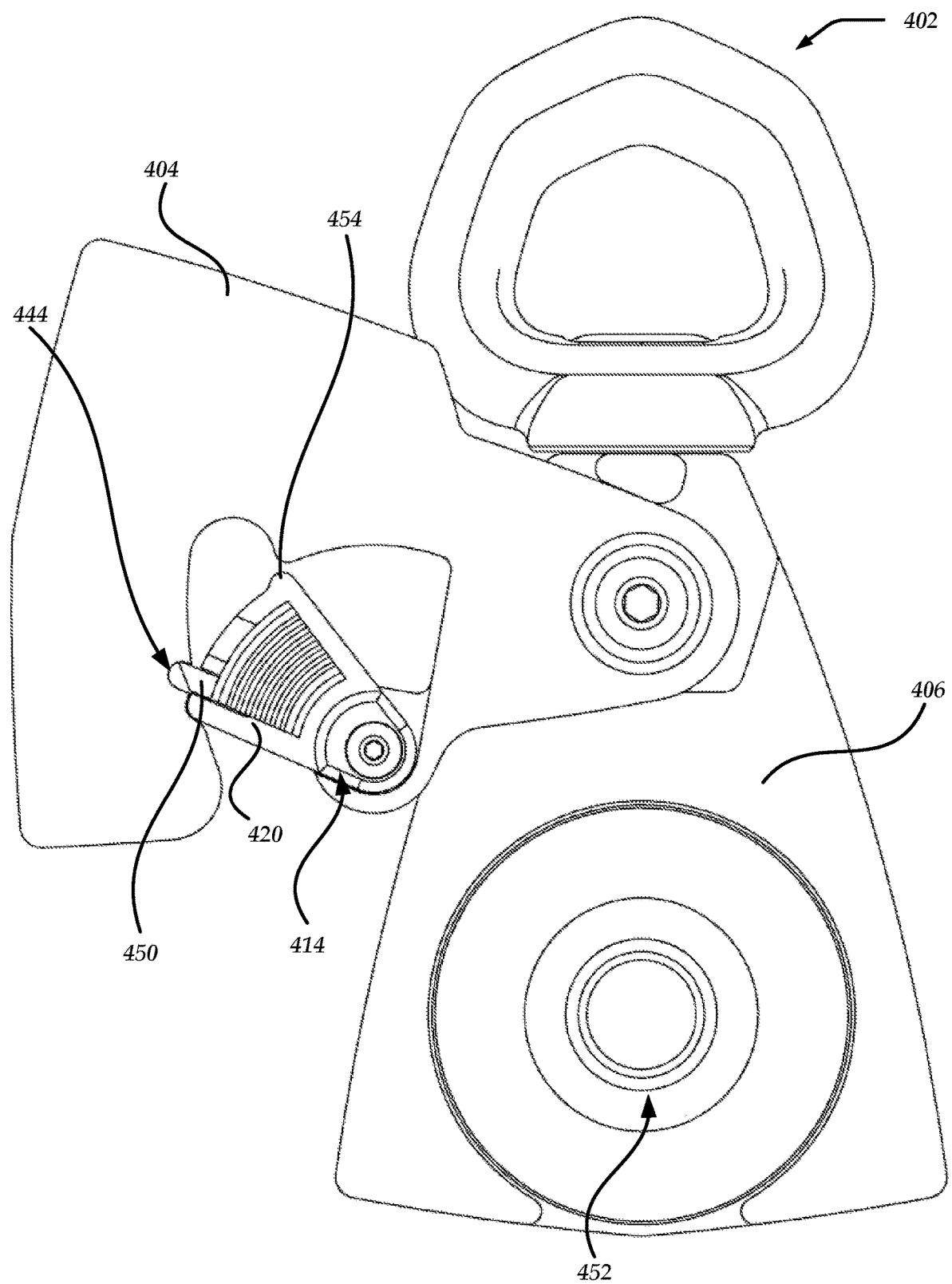
FIG. 32 is a front-side elevational view of the pulley of FIG. 29, showing the operable side plate in the open configuration.
Figure 33:
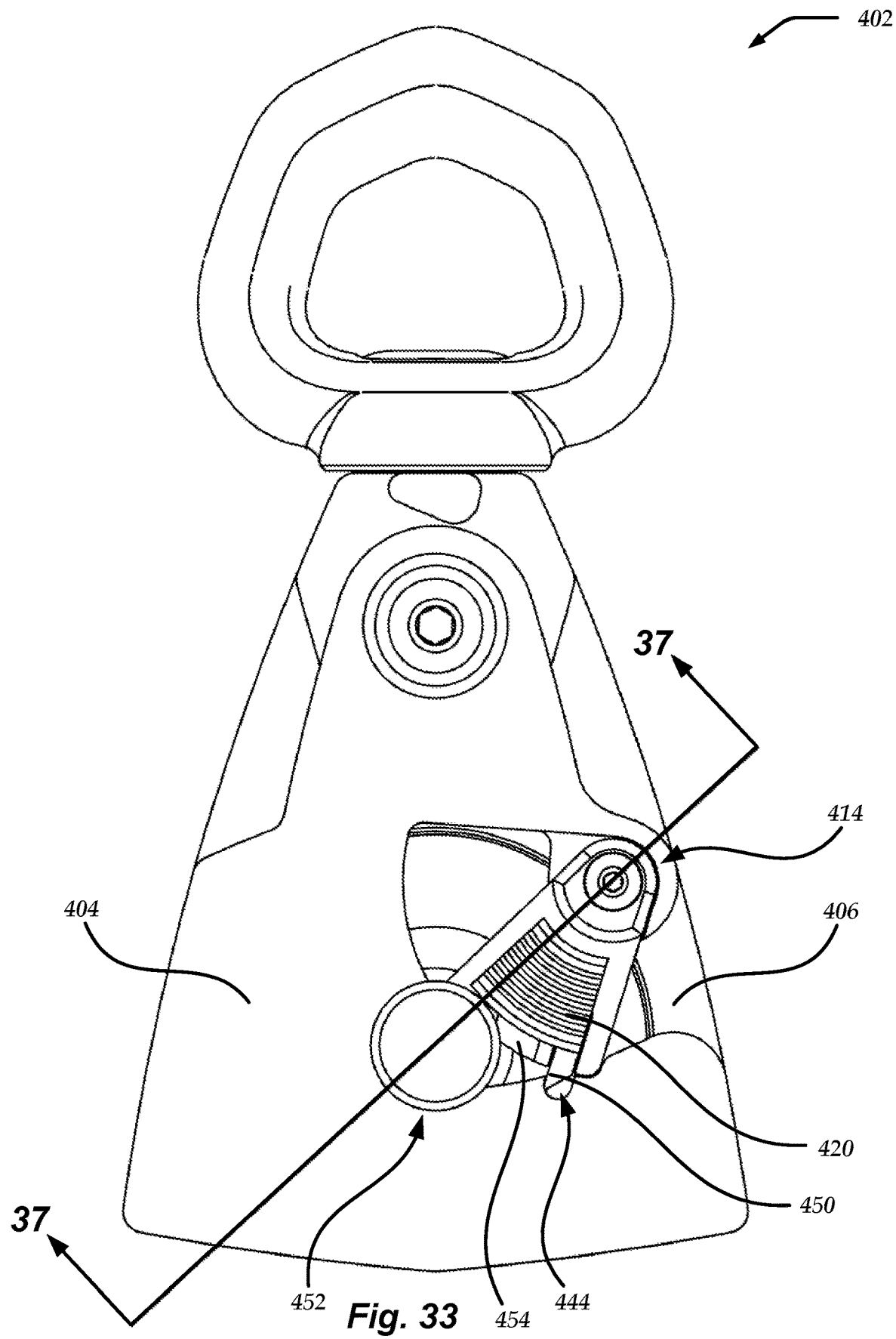
FIG. 33 is a front-side elevational view of the pulley of FIG. 29, showing the operable side plate in the closed configuration and the lock in the locked configuration with no actions initiated.

The operable side plate 404 is preferably devoid of a bridge portion (see FIGS. 31 and 32). The operable side plate 404 preferably defines one or more catches, such as catch 444 (see FIG. 33). The interface component 420 preferably actuates a latch 450, such as a retractable latch (see FIG. 33). The latch 450 preferably engages the catch 444 when the lock 414 is in the default locked configuration, thereby preventing initiation of the first action without sliding the interface component 420. The pulley 402 preferably includes another catch 452. The lock 414 preferably includes another latch 454 (see FIGS. 32 and 33) that engages the catch 452 until the second action is complete. The interface component 420 is preferably biased (for example, spring biased) toward the default locked configuration (see FIGS. 32 and 33). Accordingly, if the user transitions the operable side plate 404 to the open configuration or back to the closed configuration, the lock 414 preferably automatically returns to the default locked configuration when the user releases the lock 414 (see FIG. 32). In some versions, if the user allows the lock 414 to transition to the default locked configuration while the operable side plate 404 is in the open configuration, the user must manually transition the lock 414 to the unlocked configuration before returning the operable side plate 404 to the closed configuration. In other versions, a ramp is disposed on the inner surface of the interface component 420 to facilitate the operable side plate 404 actuating one or more of the first action or the second action to transition to the lock 414 to the unlocked configuration and, most preferably, back to the locked configuration when the operable side plate 404 transitions from the open configuration to the closed configuration.

Figure 34:
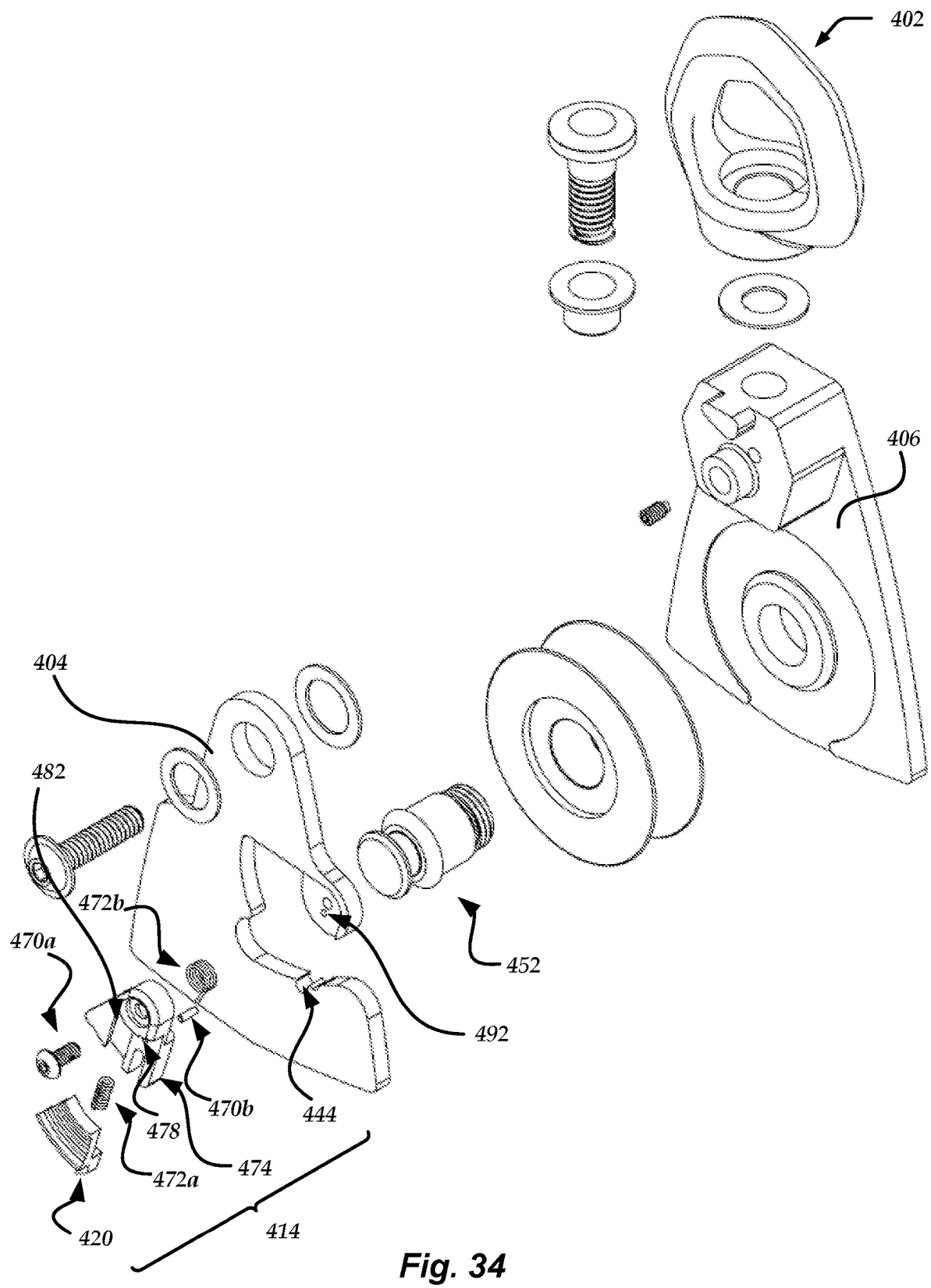
FIG. 34 is an isometric exploded view of the pulley of FIG. 29.
Figure 35:
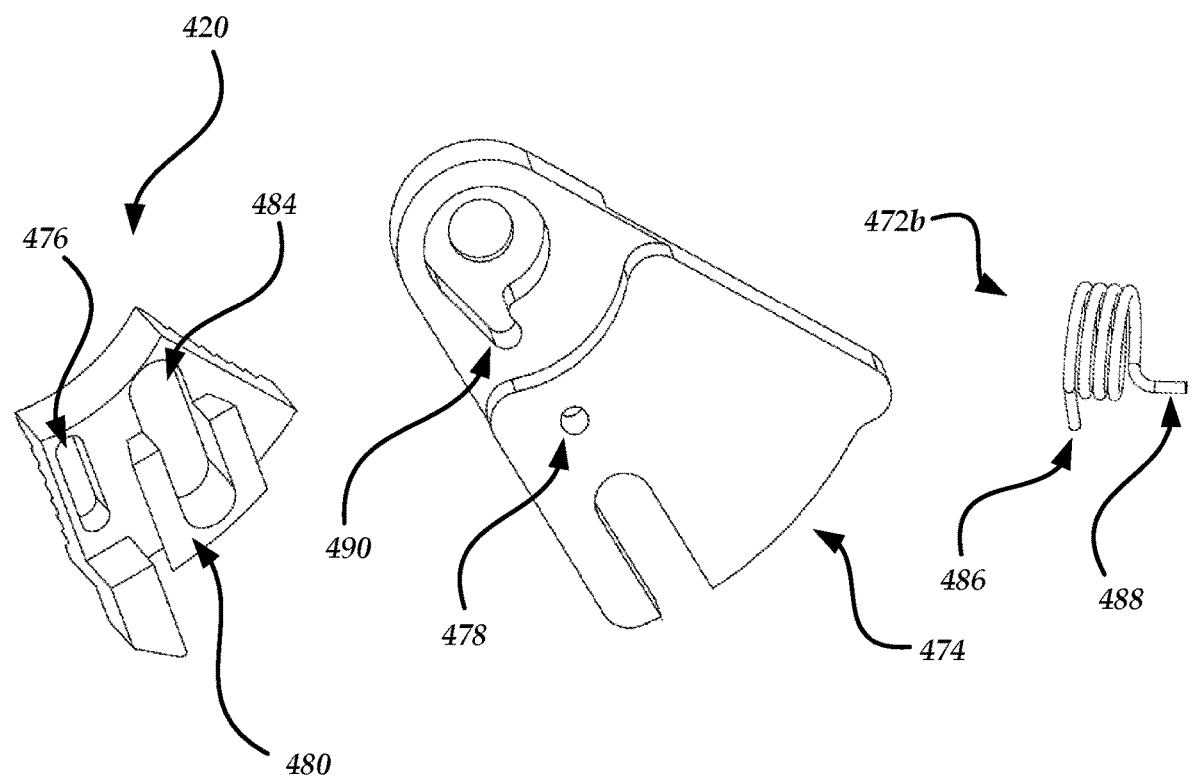
FIG. 35 is an isometric exploded view of components of the lock of the pulley of FIG. 29.
Figure 36:
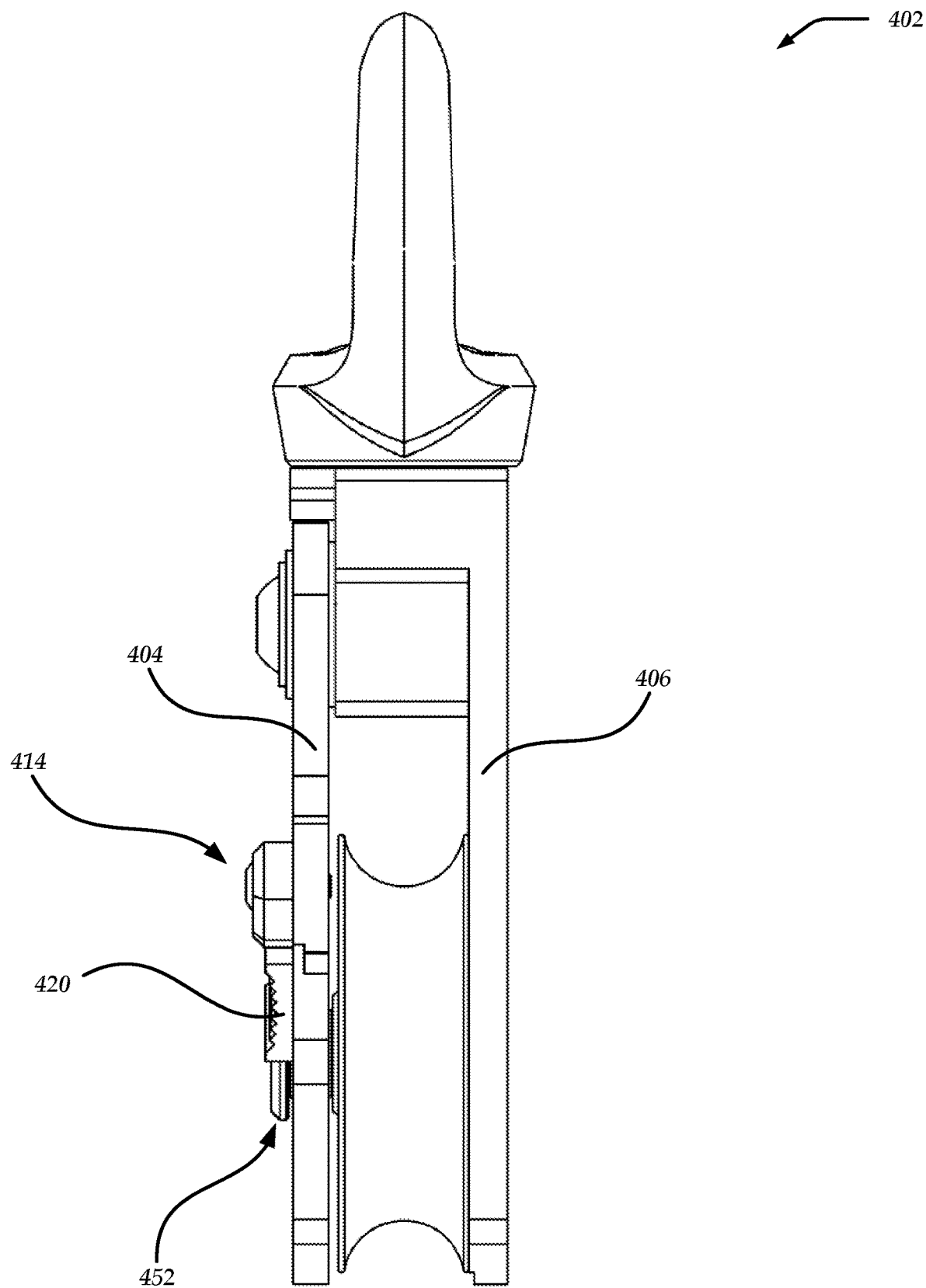
FIG. 36 is a left-side elevational view of the pulley of FIG. 29.
Figure 37:
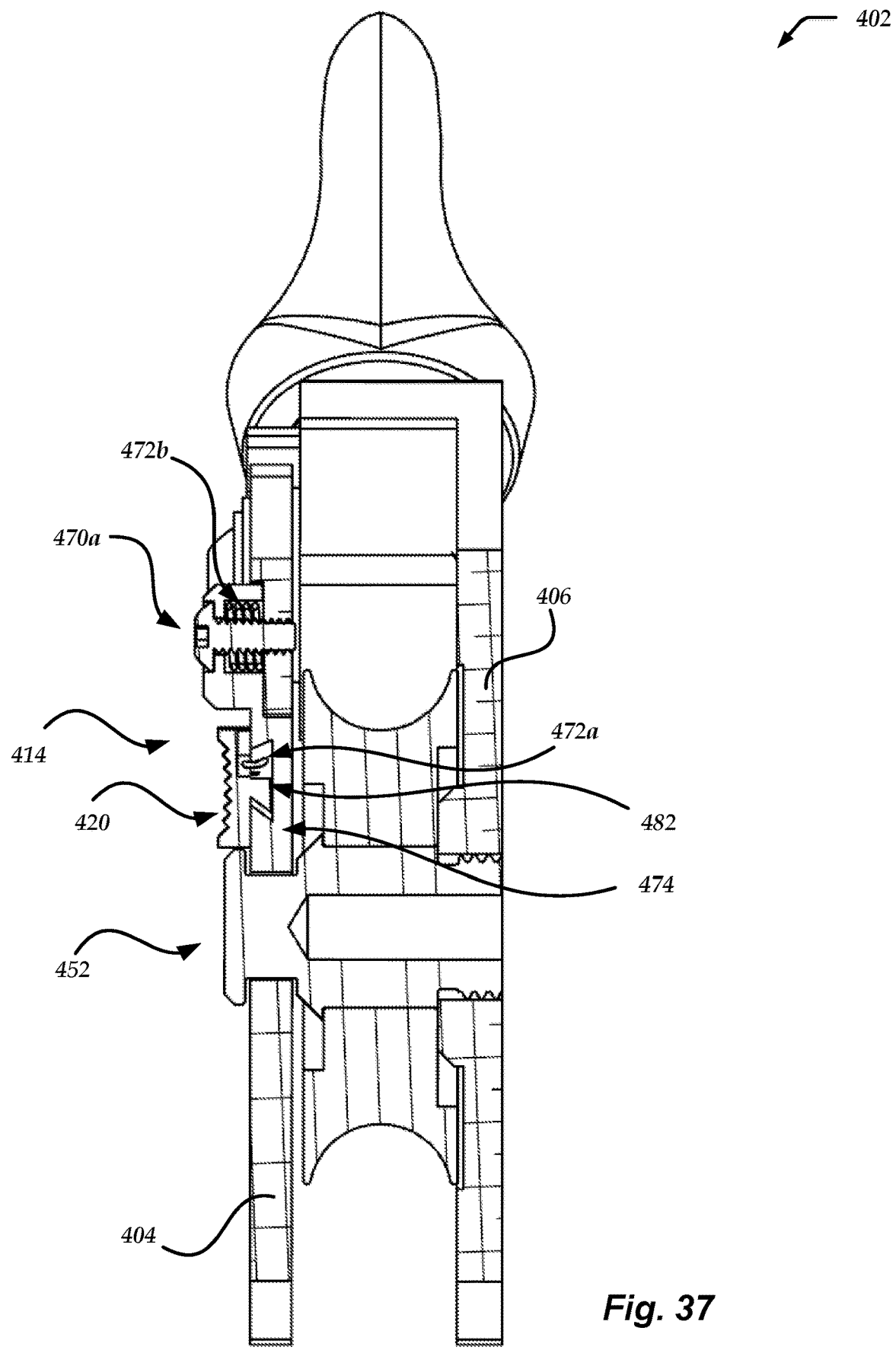
FIG. 37 is a cross-sectional view of the pulley of FIG. 29, taken along the line 37-37 in FIG. 33 and showing the lock in the locked configuration with no actions initiated.
Figure 38:
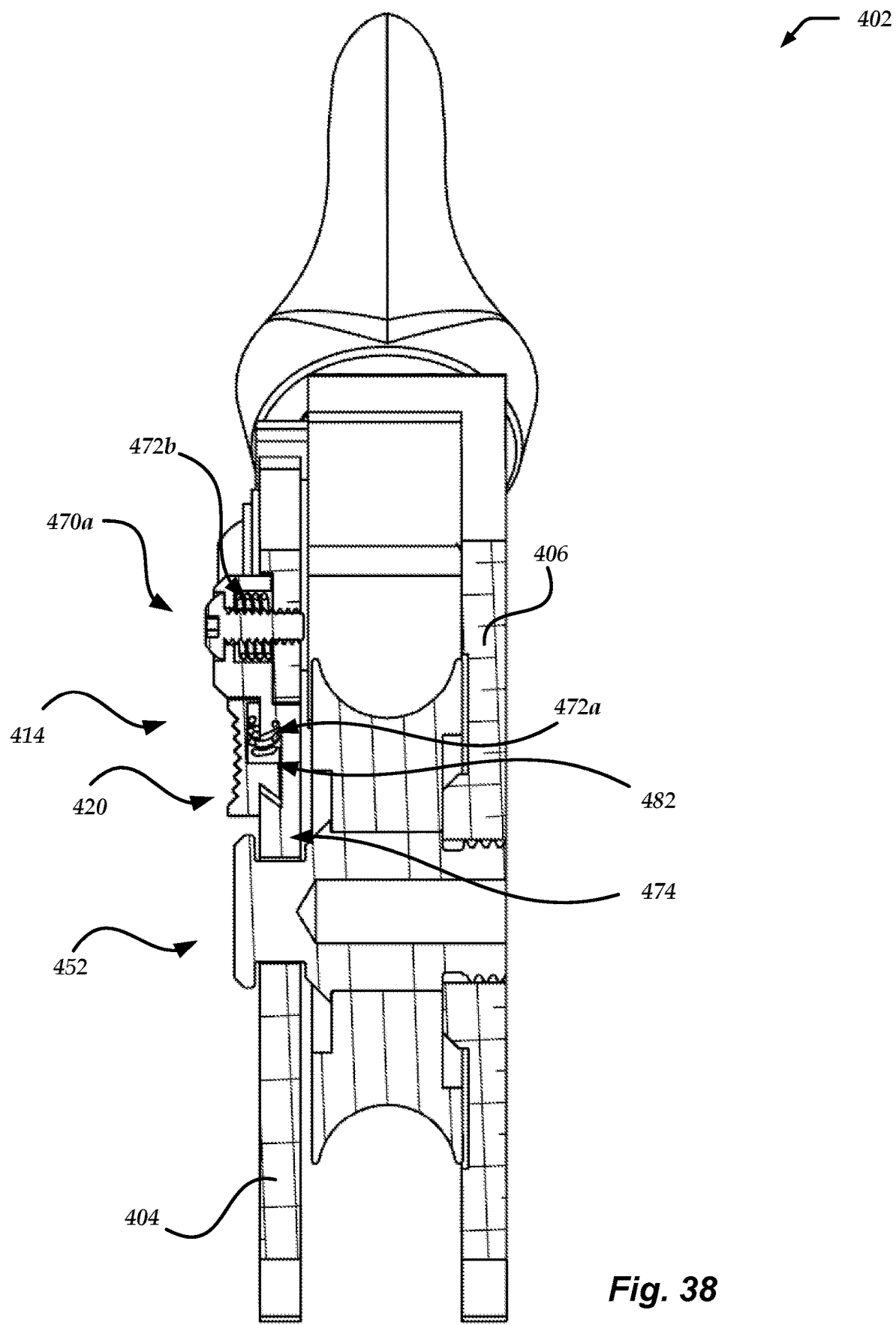
FIG. 38 is a cross-sectional view of the pulley of FIG. 29, taken along the line 37-37 in FIG. 33 and showing the lock in the locked configuration with the first action complete.
Figure 39:
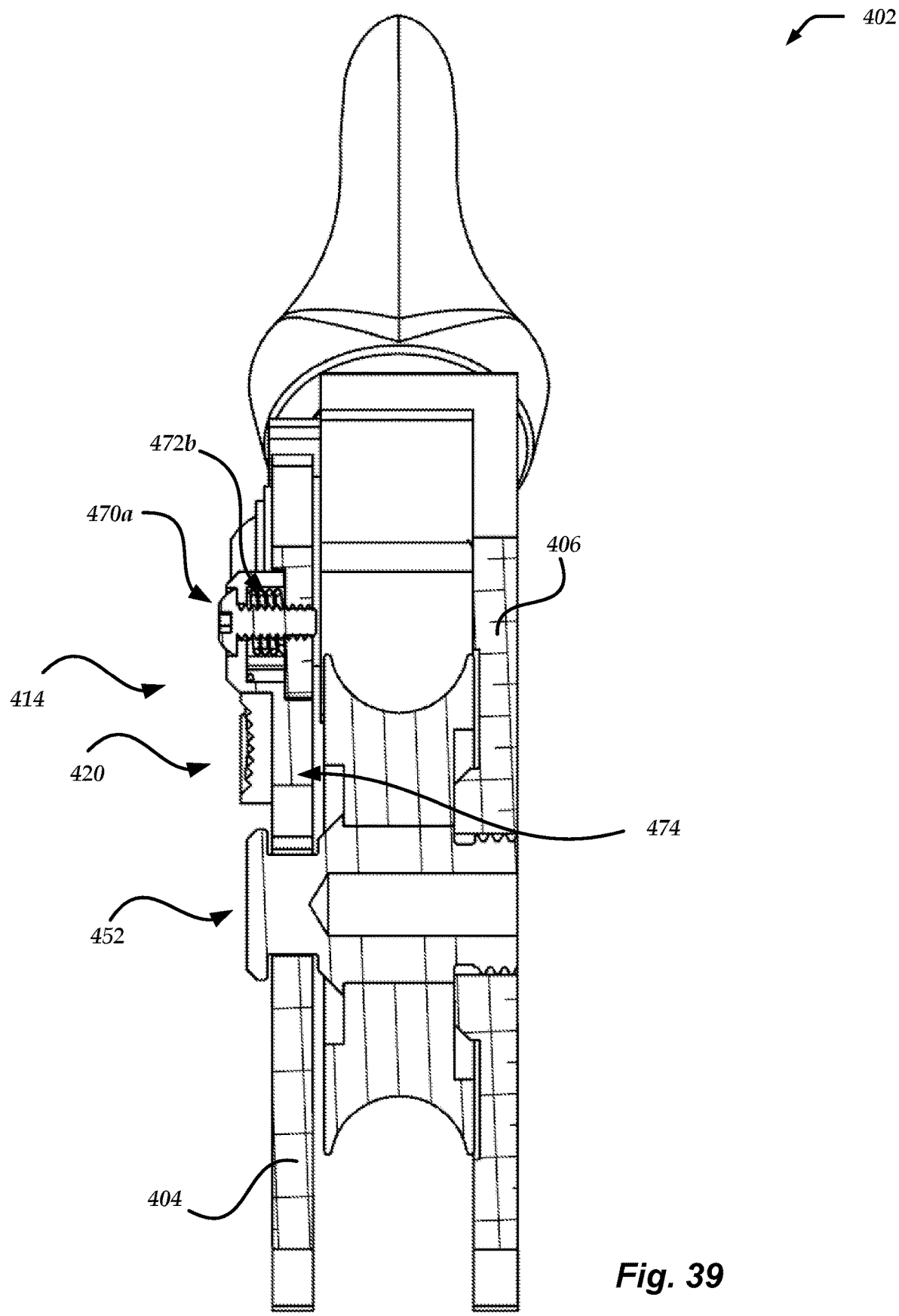
FIG. 39 is a cross-sectional view of the pulley of FIG. 29, taken along the line 37-37 in FIG. 33 and showing the lock in the unlocked configuration with the second action complete.

As shown in FIG. 34, the lock 414 preferably includes the interface component 420, a rod or pin 470a, a rod or pin 470b, a compression spring 472a, a torsion spring 472b, and a backing member 474. The inner side of the interface component 420 preferably defines a pin recess 476 (see FIG. 35). The outer side of the backing member 474 preferably defines a pin opening 478 (see FIG. 34). When the pulley 402 is assembled, the pin 470b preferably extends from the pin opening 478 into the pin recess 476 to facilitate guiding the interface component 420 as it slides relative to the backing member 474. The inner side of the interface component 420 preferably has a dovetail 480 (see FIG. 35). The outer side of the backing member 474 preferably defines a socket 482 (see FIG. 34) that is configured to slidingly receive the dovetail 480 and thereby form a sliding dovetail joint that facilitates the interface component 420 sliding relative to the backing member 474. The dovetail 480 preferably defines a spring recess 484 that is configured to receive the compression spring 472a (see FIG. 35). When the lock 414 is assembled, the compression spring 472a preferably presses against the bottom of the spring recess 484 and the top of the socket 482 of the backing member 474 to bias the interface component toward the default locked configuration. The torsion spring 472b preferably as an operable end portion 486 (for example, a radial pin or extension) and a fixed end portion 488 (for example, an axial pin or extension) (see FIG. 35). The inner side of the backing member 474 preferably defines a spring recess 490 that is configured to receive the operable end portion 486 of the torsion spring 472b (see FIG. 35). The outer side of the operably side 404 preferably defines a spring opening 492 that is configured to receive the fixed end portion 488 of the torsion spring 47b (see FIG. 34). When the pulley 402 is assembled, the torsion spring 472b preferably biases the backing member 474 and, thus, the interface component 420 toward the default locked configuration. The rod 470a preferably extends from the backing member 474 and through the torsion spring 47b to the operable side plate 404 and facilitates the interface component 420 and the backing 474 pivoting relative to the operable side plate 404 (see FIGS. 37-39). As shown in FIGS. 29-39, the interface component 420 preferably slides toward or away from the rod 470a and pivots about the rod 470a. In other versions, the interface component 420 slides away from the rod 470a to actuate the first action, a separate and distinct interface component pivots about the rod 470a or another component, such as the projection 452, to actuate the second action, one of the interface component 420 or the other interface component is coupled to and thus, when the lock 414 is in the unlocked configuration, moves with the operable side plate 404, and the other one of the interface component 420 or the other interface component is coupled to the projection 452 and thus does not move with the operable side plate 404.

Figure 40:
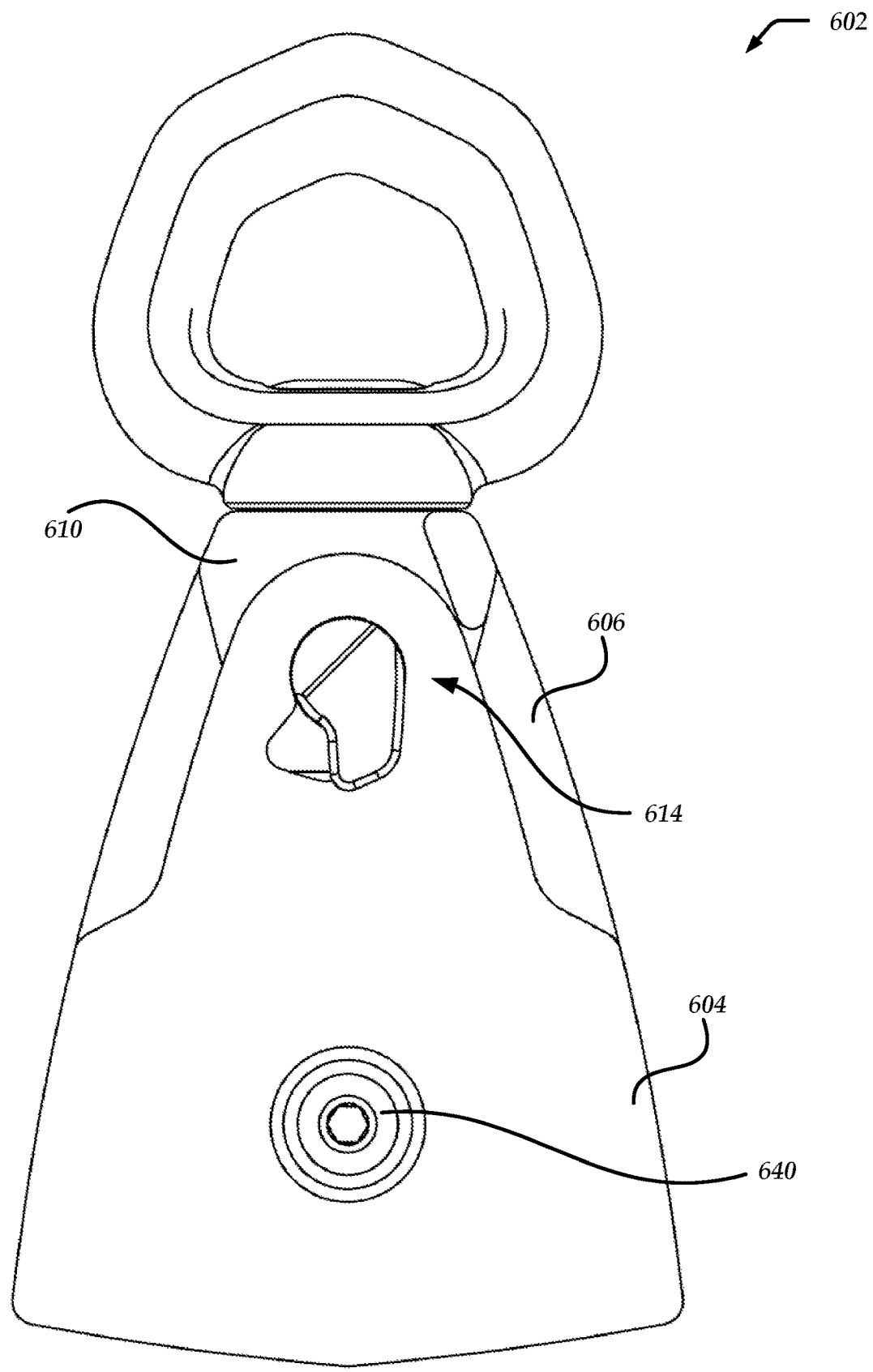
FIG. 40 is a front-side elevational view of another pulley having an operable side plate and a double-action lock according to the invention, showing the operable side plate in the closed configuration and the lock in the locked configuration with no actions initiated.
Figure 41:
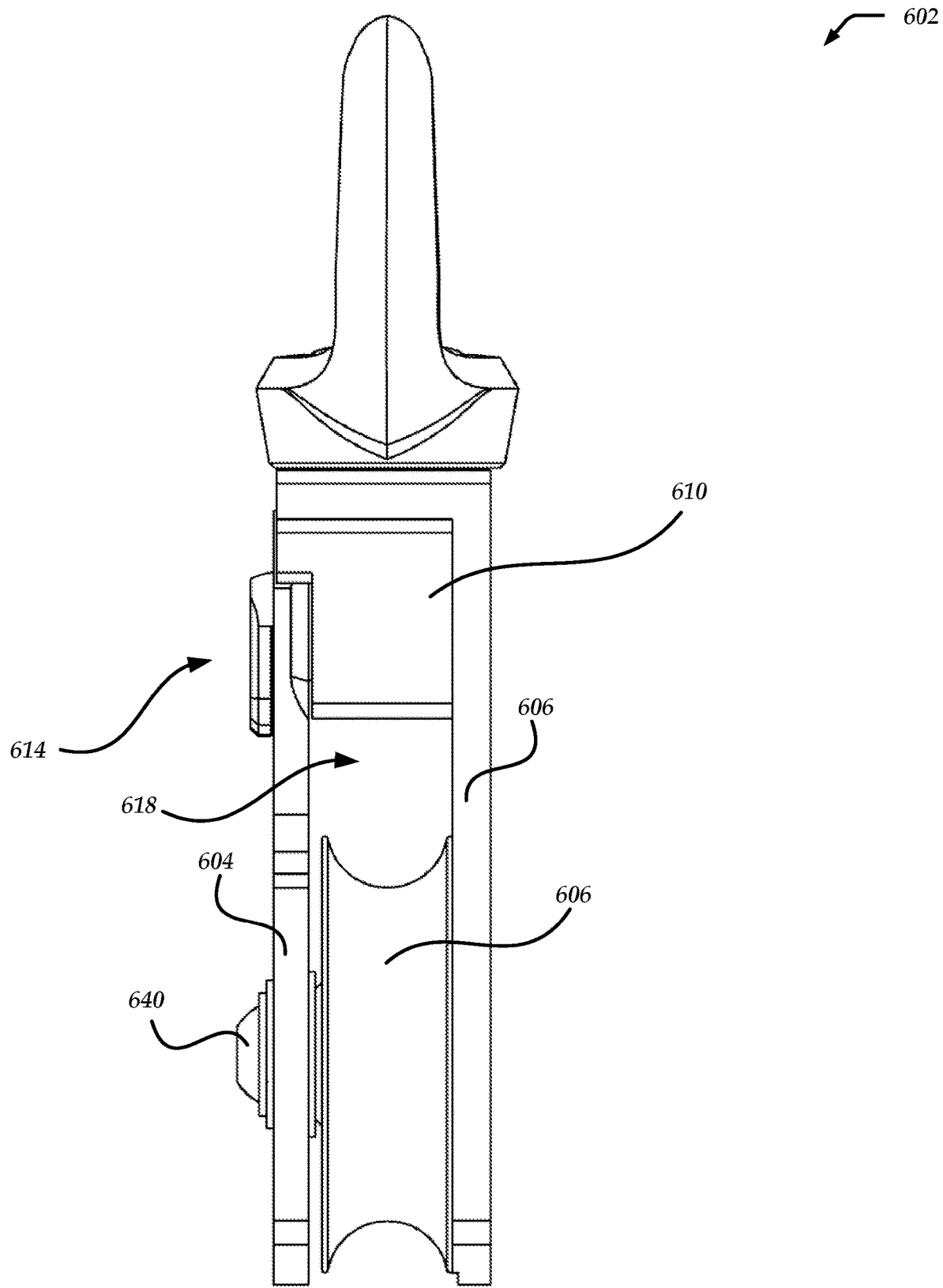
FIG. 41 is a left-side elevational view of the pulley of FIG. 40.
Figure 42:
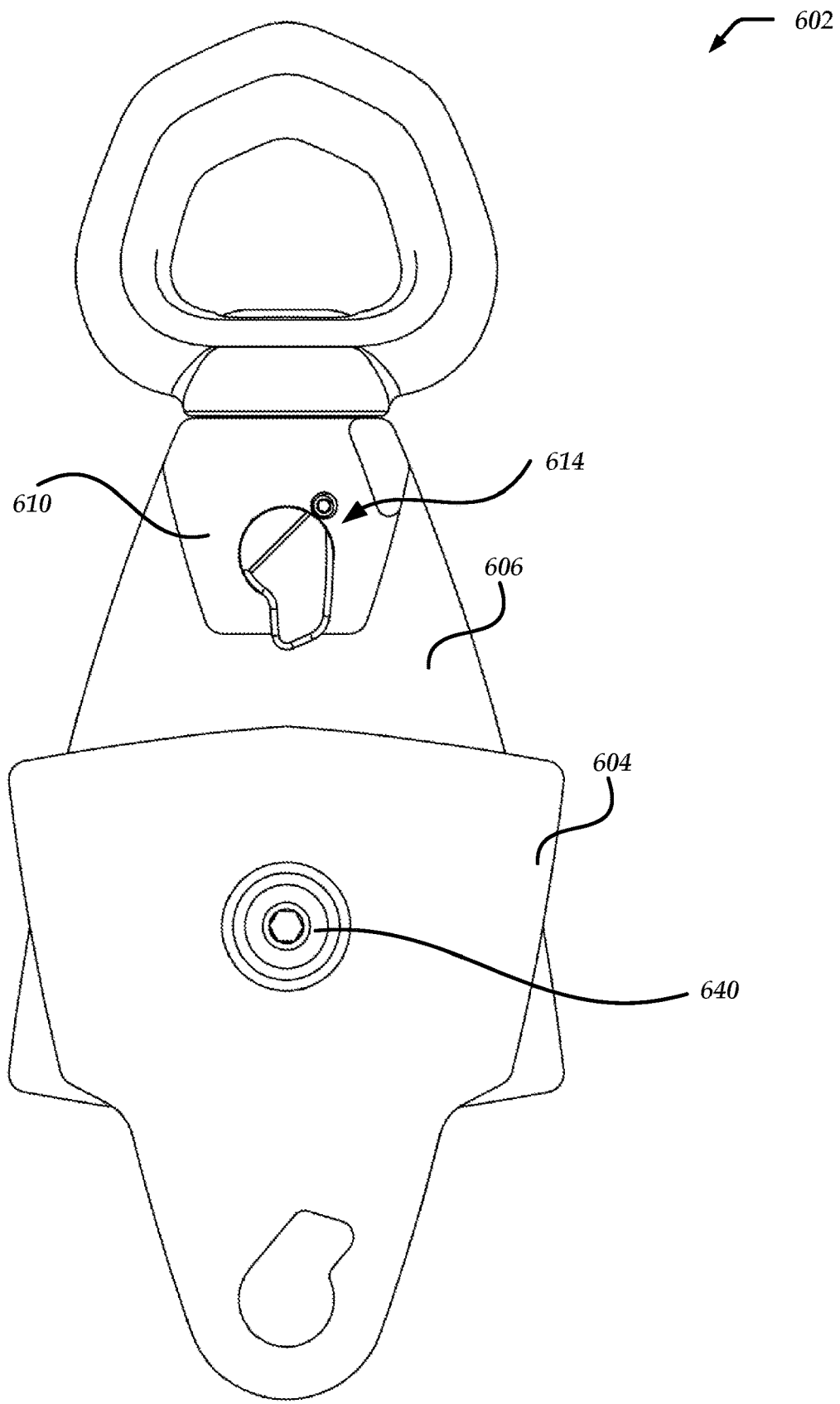
FIG. 42 is a front-side elevational view of the pulley of FIG. 40, showing the operable side plate in the open configuration.

Another pulley 602 in accordance with the principles of the invention is shown in FIG. 40. The pulley 602 has many components, configurations, and functions in common with one or more of the pulley 2, the pulley 202, or the pulley 402, and those common components, configurations, and functions may be understood by referencing the detailed disclosure regarding one or more of the pulley 2, the pulley 202, or the pulley 402 and are incorporated by reference again herein as if directed toward the pulley 602. The pulley 602 preferably has an operable side plate 604, a fixed side plate 606, a sheave 608 disposed between the side plates 604, 606, a crown 610, and a double-action lock 614 (see FIGS. 40 and 41). At lease when the operable side plate 604 is in the closed configuration, the lock 614 may be disposed opposite the swallow 618 from the sheave 608 (see FIG. 41). Components of the lock 614 may be disposed in, coupled to, or interacting with the crown 610. The pulley 602 preferably has a sheave pin 640 that rotatably couples the operably plate 604 to the sheave 608 or the fixed plate 606 (see FIGS. 40-42). Accordingly, when the lock 614 is in the unlocked configuration, the user preferably may pivot the operable side plate 604 about the rotational axis of the sheave 608 to transition the operable plate 604 from the closed configuration to the open configuration (see FIG. 42).

As used herein, the following terms take the meanings explicitly associated herein, unless the context clearly dictates otherwise. The term "or" is an inclusive grammatical conjunction to indicate that one or more of the connected terms may be employed. For example, the phrase "one or more A, B, or C" or the phrase "one or more As, Bs, or Cs" is employed to discretely disclose each of the following: i) one or more As, ii) one or more Bs, iii) one or more Cs, iv) one or more As and one or more Bs, v) one or more As and one or more Cs, vi) one or more Bs and one or more Cs, and vii) one or more As, one or more Bs, and one or more Cs. The term "based on" as used herein is not exclusive and allows for being based on additional factors not described. The articles "a," "an," and "the" include plural references. Plural references are intended to also disclose the singular.

The term "substantially parallel" refers to parallel or within 5, 10, 15, 20, 25, 30, 35, 40, or 45 degrees of parallel. The term "configured" refers to one or more of being sized, dimensioned, positioned, or oriented to achieve the described feature, characteristic, function, or result.

The terms "inner" and "outer" are defined relative to the swallow of the corresponding pulley. For example, an inner face or side of a side plate generally faces toward the swallow, whereas the outer face or side of the side plate faces away from the swallow and toward the exterior environment. The term "transverse" refers to a non-parallel orientation and includes yet is not limited to a perpendicular orientation.

While the preferred embodiments of the invention have been illustrated and described, as noted above, many changes can be made without departing from the spirit and scope of the invention. For example, each disclosure of a component preferably having a feature or characteristic is intended to also disclose the component as being devoid of that feature or characteristic, unless the principles of the invention clearly dictate otherwise. Moreover, each of the pulleys 2, 202, 402, or 602 may have any one or more of their corresponding components swapped, mixed, or matched with any one or more corresponding components in one or more other ones of the pulleys 2, 202, 402, or 602. For example, the locks 14, 214, or 414 may be disposed at the crown as shown regarding they pulley 602. As another example, the locks 14, 214, or 614 may be mounted to the operable side plate and thus move with the operable side plate when the operable side plate is transitioned to the open configuration as shown regarding the pulley 402. Accordingly, the scope of the invention is not limited by the disclosure of the preferred embodiments. Instead, the invention should be determined entirely by reference to the claims that follow. It should also be noted that the claim dependencies or combinations of elements recited in the claims does not reflect an intention to forgo claiming other subject matter disclosed herein. Instead, this disclosure is intended to also disclose the subject matter of any combination of any two or more of the claims, such that subsequent claim sets may recite that any one of the dependent claims depends from any other one or more claims, up to and including all other claims in the alternative (for example, "The engine of any one of the preceding or subsequent claims . . . "). This disclosure is also intended to disclose the subject matter of any one of the dependent claims, as if it was an independent claim, with or without all or a portion of the subject matter of the original independent claim(s) or any other subject matter disclosed herein.

The invention claimed is:

1. A pulley comprising:
   a fixed side plate;
   an operable side plate that is transitionable between a closed configuration and an open configuration by pivoting about a pivot axis;
   a sheave disposed between the fixed side plate and the operable side plate, the sheave having a rotational axis that is parallel to the pivot axis; and
   a lock that is transitionable from a locked configuration to an unlocked configuration upon completion of two separate and distinct actions after the lock is in the locked configuration, the lock in the locked configuration preventing transition of the operable side plate from the closed configuration to the open configuration, and the lock in the unlocked configuration permitting transition of the operable side plate from the closed configuration to the open configuration.

2. The pulley of claim 1, wherein the two actions include a first action and a second action, the lock preventing a user from initiating the second action until the first action is complete.

3. The pulley of claim 2, wherein the lock has an interface component, and the first action includes pivoting the interface component.

4. The pulley of claim 2, wherein the lock has an interface component, and the first action includes sliding the interface component.

5. The pulley of claim 2, wherein the lock has an interface component, and the second action includes depressing the interface component.

6. The pulley of claim 2, wherein the lock has an interface component, and the second action includes pivoting the interface component.

7. The pulley of claim 1, wherein the operable side plate is configured to transition the lock from the locked configuration to the unlocked configuration when the operable side plate transitions from the open configuration to the closed configuration.

8. The pulley of claim 7, wherein the operable side plate is configured to transition the lock from the locked configuration to the unlocked configuration and back to the locked configuration when the operable side plate transitions from the open configuration to the closed configuration.

9. The pulley of claim 7, wherein the two actions include a first action and a second action, the lock preventing a user from initiating the second action until the first action is complete, and the operable side plate is configured to initiate and complete the second action when the operable side plate transitions from the open configuration to the closed configuration.

10. The pulley of claim 9, wherein the operable side plate is configured to initiate and complete the first action and subsequently initiate and complete the second when the operable side plate transitions from the open configuration to the closed configuration.

11. The pulley of claim 9, wherein the operable side plate is configured to initiate and complete the second action when the operable side plate transitions from the open configuration to the closed configuration without the first action being initiated.

12. The pulley of claim 1, wherein the lock has a combination spring, the combination spring biasing the lock toward a default locked configuration wherein neither of the two actions has been initiated.

13. The pulley of claim 12, wherein the combination spring provides a torsion bias and an extension bias.

14. The pulley of claim 12, wherein the combination spring provides a torsion bias in a first rotational direction and a torsion bias in a second rotational direction that is opposite the first rotational direction.

15. The pulley of claim 1, wherein the lock is coaxial with the sheave.

16. The pulley of claim 1, wherein the lock engages a projection that is coaxial with the sheave.

17. The pulley of claim 1, wherein the operable side plate is coaxial with the sheave.

18. The pulley of claim 1, wherein the lock includes a rod that defines an indexed recess, a housing that houses the rod, and a pin that extends from the housing into the indexed recess of the rod.

19. A method of using a pulley, the method comprising:
   providing the pulley of claim 1;
   completing a first action of the two separate and distinct actions of the lock;
   after completing the first action, completing a second action of the two separate and distinct actions of the lock;
   after completing the second action, transitioning the operable side plate from the closed configuration to the open configuration;
   after transitioning the operable side plate to the open configuration, placing a bight of an elongated element on the sheave; and
   after placing the bight on the sheave, transitioning the operable side plate from the open configuration to the closed configuration.

20. The method of claim 19, wherein transitioning the operable side plate from the open configuration to the closed configuration includes transitioning the lock from the locked configuration to the unlocked configuration and back to the locked configuration without the user touching the lock.

21. The pulley of claim 1, wherein the fixed side plate has a first inner surface and the operable side plate has a second inner surface that in the closed configuration faces the first inner surface of the fixed side plate, the first and second inner surfaces being disposed opposite the sheave from each other in the closed configuration, the second inner surface of the operable side plate being substantially parallel to the first inner surface of the fixed side plate in the open configuration.

* * * * *